(12) United States Patent
Kusuda

(10) Patent No.: US 8,223,240 B2
(45) Date of Patent: Jul. 17, 2012

(54) IMAGE PICKUP DEVICE AND IMAGE PICKUP APPARATUS

(75) Inventor: Masayuki Kusuda, Akashi (JP)

(73) Assignee: Konica Minolta Holdings, Inc., Tokyo (JP)

(*) Notice: Subject to any disclaimer, the term of this patent is extended or adjusted under 35 U.S.C. 154(b) by 1066 days.

(21) Appl. No.: 12/132,322

(22) Filed: Jun. 3, 2008

(65) Prior Publication Data
US 2008/0303928 A1 Dec. 11, 2008

(30) Foreign Application Priority Data

Jun. 7, 2007 (JP) ................. 2007-151459

(51) Int. Cl.
H04N 5/335 (2011.01)
H04N 3/14 (2006.01)
(52) U.S. Cl. ........................ 348/314; 348/302
(58) Field of Classification Search .......... 348/302, 348/314
See application file for complete search history.

(56) References Cited

U.S. PATENT DOCUMENTS

| 6,831,691 | B1 | 12/2004 | Takada et al. | 348/308 |
| 6,927,884 | B2 | 8/2005 | Takada et al. | 358/513 |
| 7,164,443 | B1 | 1/2007 | Hagihara | 348/308 |
| 2006/0001061 | A1 | 1/2006 | Miyatake et al. | |
| 2006/0170491 | A1* | 8/2006 | Wany et al. | 330/4.9 |

FOREIGN PATENT DOCUMENTS

| JP | 11-298798 A | 10/1999 |
| JP | 2001-36822 A | 2/2001 |
| JP | 2002-77733 A | 3/2002 |
| JP | 2006-050544 | 2/2006 |
| JP | 2006-140666 A | 6/2006 |

OTHER PUBLICATIONS

English Translation of Japanese Office Action mailed Mar. 21, 2012 in Japanese Patent Application No. 2007-151459.

* cited by examiner

Primary Examiner — William Choi
(74) Attorney, Agent, or Firm — Cozen O'Connor

(57) ABSTRACT

To provide an image pickup device and an image pickup apparatus which are equipped with a linear-log sensor which can cancel variations between pixels in an inflection point caused by variations in a threshold of the transistors constituting a logarithmic conversion circuit while using a circuit constitution similar to a pixel circuit of an image pickup device having only an ordinary linear characteristic. When the photoelectric charge accumulated in a photoelectric conversion element is removed, a charge removing transistor is controlled such that the potential of the channel of the charge removing transistor is set to be higher than the minimum potential of the photoelectric conversion element.

10 Claims, 25 Drawing Sheets

T=T5

T=T7

T=T16

T=T12

IMAGE PICKUP DEVICE AND IMAGE PICKUP APPARATUS

This application claims priority on Japanese Patent Application No. 2007-151459 filed on Jun. 7, 2007, in Japanese Patent Office, the entire content of which is hereby incorporated by reference.

TECHNICAL FIELD

The present invention relates to an image pickup device and an image pickup apparatus and more particularly to an image pickup device made up of pixels operating with two photoelectric conversion characteristics of a linear characteristic and a logarithmic characteristic, and an image pickup apparatus having the concerned image pickup device.

BACKGROUND

In recent years, as more automobiles have been equipped with an electronic camera, the image pickup device has been required to have higher performance. In particular, it is a big theme to enlarge the brightness range of a photographic object which can be handled by the image pickup device, that is, the dynamic range (hereinafter, referred to as a D range).

Regarding enlargement of the D range, proposed is a logarithmic conversion type image pickup device (hereinafter, referred to as a log sensor) in which the output characteristic of the image pickup device has an output characteristic where the amount of the incident light is logarithmically converted into an electric signal by using the sub-threshold characteristic of an MOSFET, where a logarithmic conversion circuit having the MOSFET is added to an image pickup device made up of photoelectric conversion elements such as photodiodes arranged in a matrix (for example, refer to Unexamined Japanese Patent Application Publication No. H11-298798).

However, the log sensor is low in the apparent contrast due to its wide D range, so that its image is not very good particularly in the low brightness region. Therefore, in the linear-log sensor, there is proposed a linear logarithmic conversion type image pickup device (hereinafter, referred to as a linear-log sensor) in which a linear operation state (hereinafter, referred to as a linear characteristic) and the aforementioned logarithmic operation state (hereinafter, referred to as a log characteristic) can be switched automatically (hereinafter, referred to as linear-log characteristic), where a specific reset voltage is given to the MOSFET in order to automatically switch the two states of the log characteristic and the linear characteristic which is the original output characteristic of the image pickup device in which the incident light intensity is linearly converted into the electric signal (for example, refer to Unexamined Japanese Patent Application Publication No. 2002-77733).

Furthermore, in the linear-log sensor, there is proposed a pixel circuit constitution which cancels the variations, between the pixels, in the switching point (hereinafter, referred to as inflection point) between the linear characteristic and log characteristic for each pixel, which variations are caused by variations in the thresholds of the transistors constituting the logarithmic conversion circuit, (for example, refer to Unexamined Japanese Patent Application Publication No. 2001-36822).

Further, in the linear-log sensor, there is proposed a method in which the point (hereinafter, referred to as an inflection point) where the output characteristic (hereinafter, referred to as a photoelectric conversion characteristic) is changed from the linear characteristic to the log characteristic is detected by using light shield pixels (for example, refer to Unexamined Japanese Patent Application Publication No. 2006-140666). According to Unexamined Japanese Patent Application Publication No. 2006-140666, it is said that the position of the inflection point can be detected even if the temperature and integrating time are changed.

However, in the method disclosed in Unexamined Japanese Patent Application Publication No. 2001-36822, a problem arises that the pixel size is increased or the aperture rate of the photoelectric conversion section is lowered because of a larger number of the transistors constituting the pixel than the pixel circuit of an image pickup device having only the ordinary linear characteristic.

Further, in the invention disclosed in Unexamined Japanese Patent Application Publication No. 2006-140666, the same basic pixel circuit constitution as that of the image pickup device having only the ordinary linear characteristic is used, so that it is impossible to cancel the variations, between the pixels, in the inflection point which is caused by the variations in the thresholds of the transistors constituting the logarithmic conversion circuit.

Furthermore, in the invention disclosed in Unexamined Japanese Patent Application Publication No. 2006-140666, the reset potential connected to the reset transistor needs to be different from the potential of the power source so that the floating diffusion reset potential can be set variably, and the reset transistor needs to be formed isolated from the other transistors, and many wires are required, so that a problem arises that the pixel size is greater and the aperture ratio is smaller than the image pickup device having only the ordinary linear characteristic.

SUMMARY

The present invention was developed with the foregoing in view and is intended to provide an image pickup device and an image pickup apparatus in which it is possible to cancel the variations, between the pixels, in the inflection points of the pixels in the linear-log sensor, the variations in which are caused by the variations in the thresholds of the transistors constituting the logarithmic conversion circuit, while making the pixel size and the aperture ratio equivalent to those of the image pickup device having the ordinary linear characteristic by using the circuit constitution similar to the pixel circuit of the image pickup device having only the ordinary linear characteristic.

In view of forgoing, one embodiment according to one aspect of the present invention is an image pickup device, comprising:

a plurality of pixels arranged in a matrix, the pixels being adapted to operate with two photo electric conversion characteristics of a linear characteristic and a logarithmic characteristic; each of the pixels including:

a photoelectric conversion element; and a charge removing transistor with a source thereof connected to the photoelectric conversion element for removing electric charge accumulated in the photoelectric conversion element, an imaging control section for controlling an imaging operation of the pixels, wherein when the imaging control section causes the charge removing transistor to remove the electric charge accumulated in the photoelectric conversion element, the imaging control section sets an electric potential of a gate of the charge removing transistor such that a potential of a channel of the charge removing transistor is higher than a minimum potential of the photoelectric conversion element.

According to another aspect of the present invention, another embodiment is an image pickup apparatus, comprising:

an image pickup device; and an imaging optical system for guiding a light beam from an object to the image pickup device, wherein the image pickup device includes:

a plurality of pixels arranged in a matrix, the pixels being adapted to operate with two photo electric conversion characteristics of a linear characteristic and a logarithmic characteristic; each of the pixels including:

a photoelectric conversion element; and a charge removing transistor with a source thereof connected to the photoelectric conversion element for removing electric charge accumulated in the photoelectric conversion element, an imaging control section for controlling an imaging operation of the pixels, wherein when the imaging control section causes the charge removing transistor to remove the electric charge accumulated in the photoelectric conversion element, the imaging control section sets an electric potential of a gate of the charge removing transistor such that a potential of a channel of the charge removing transistor is higher than a minimum potential of the photoelectric conversion element.

According to another aspect of the present invention, another embodiment is an image pickup device, comprising:

a plurality of pixels arranged in a matrix, the pixels being adapted to operate with two photo electric conversion characteristics of a linear characteristic and a logarithmic characteristic; each of the pixels including:

a photoelectric conversion element; and a charge removing transistor with a source thereof connected to the photoelectric conversion element for removing electric charge accumulated in the photoelectric conversion element, an imaging control section for controlling an imaging operation of the pixels, wherein when the imaging control section causes the charge removing transistor to remove the electric charge accumulated in the photoelectric conversion element, the imaging control section controls the charge removing transistor such that a gate of the charge removing transistor is set at an electric potential at which not all of the electric charge accumulated in the photoelectric conversion element is removed.

According to another aspect of the present invention, another embodiment is an image pickup apparatus, comprising:

an image pickup device; and an imaging optical system for guiding a light beam from an object to the image pickup device, wherein the image pickup device includes:

a plurality of pixels arranged in a matrix, the pixels being adapted to operate with two photo electric conversion characteristics of a linear characteristic and a logarithmic characteristic; each of the pixels including:

a photoelectric conversion element; and a charge removing transistor with a source thereof connected to the photoelectric conversion element for removing electric charge accumulated in the photoelectric conversion element, an imaging control section for controlling an imaging operation of the pixels, wherein when the imaging control section causes the charge removing transistor to remove the electric charge accumulated in the photoelectric conversion element, the imaging control section controls the charge removing transistor such that a gate of the charge removing transistor is set at an electric potential at which not all of the electric charge accumulated in the photoelectric conversion element is removed.

DETAILED DESCRIPTION OF THE PREFERRED EMBODIMENTS

Figure 1:
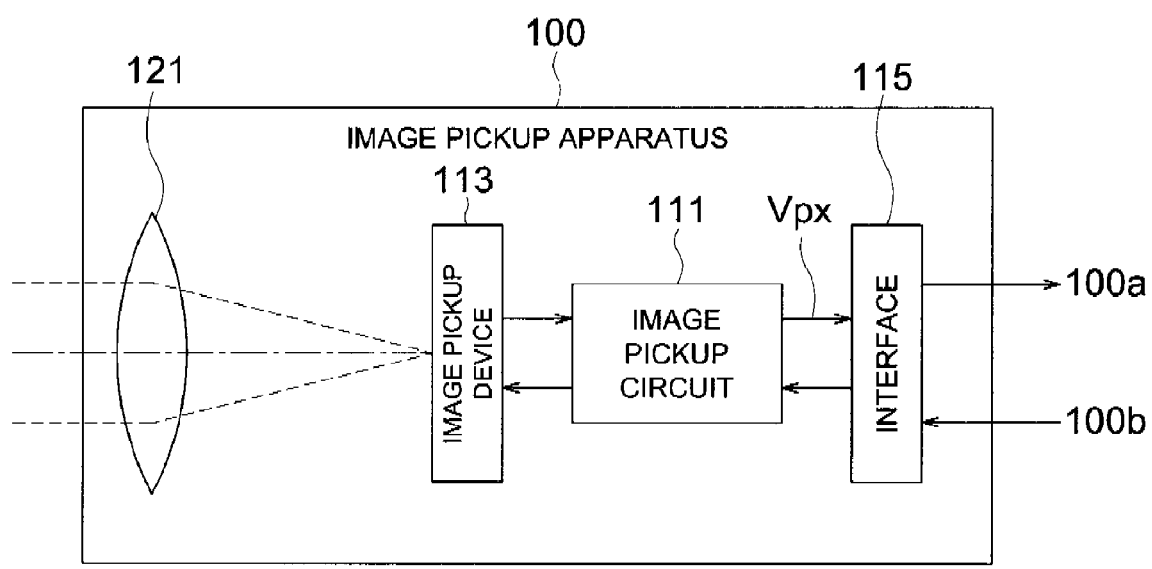
FIG. 1 is a block diagram showing the internal constitution of an image pickup device according to an embodiment of the present invention.

Hereinafter, the embodiments of the present invention will be explained with reference to the accompanying drawings. Further, the same numbers are assigned to the same or similar parts in the drawings, and duplicated explanation will be omitted.

Firstly, an example of the constitution of the image pickup apparatus of the embodiments of the present invention will be explained by referring to FIG. 1. FIG. 1 is a block diagram showing the internal constitution of the image pickup apparatus.

In FIG. 1, an image pickup apparatus 100 is made up of an image pickup optical system 121, an image pickup circuit 111, an image pickup device 113, and an interface 115. The image pickup device 113 is a linear-log sensor according to an embodiment of the present invention. The constitution thereof will be explained later by referring to FIGS. 2 and 3.

A light beam from a photographic object is focused by the image pickup optical system 121 and is imaged on the image pickup device 113. Light from the imaged photographic object is photoelectrically converted by the image pickup device 113 into an electric signal, and the electric signal is digitized by the image pickup circuit 111, and is converted to a pixel signal Vpx. The pixel signal Vpx is outputted outside the image pickup apparatus 100 as pixel data 100a via the interface 115. Each of the aforementioned operations is controlled by the image pickup circuit 111 under the control of a control signal 100b inputted from the outside into the image pickup circuit 111 via the interface 115. The image pickup circuit 111 functions as an imaging control section of the present invention.

Figure 2:
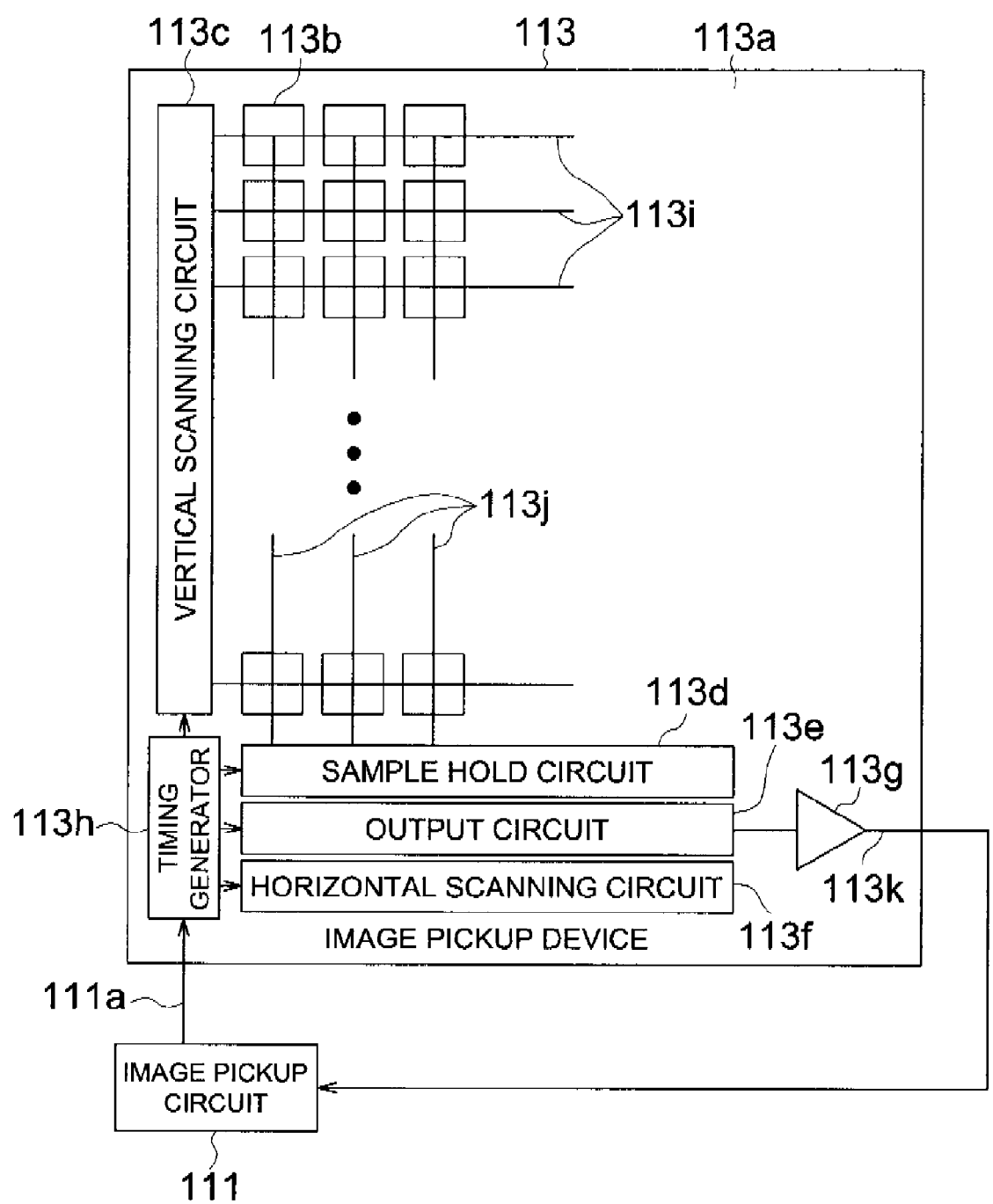
FIG. 2 is a schematic diagram showing arrangement of each unit composing the image pickup device according to the embodiment of the present invention.

Next, the constitution of the image pickup device 113 of this embodiment will be explained by referring to FIG. 2. FIG. 2 is a schematic diagram showing the arrangement of each unit composing the image pickup device 113.

In FIG. 2, the image pickup device 113 is made up of pixels 113b arranged in m rows (horizontal) and n columns (vertical), a vertical scanning circuit 113c, a sample hold circuit 113d, an output circuit 113e, a horizontal scanning circuit 113f, an output amplifier 113g, and a timing generator 113h.

The horizontal rows of the pixels 113b are sequentially selected by the vertical scanning circuit 113c and the output signal of the pixel 113b of each column of each selected row is held by the sample hold circuit 113d. The output signal of each of the pixels 113b held by the sample hold circuit 113d, with the horizontal scanning circuit 113f scanning, is sequentially outputted from the output circuit 113e as an output signal 113k via the output amplifier 113g. These operations are controlled by the timing generator 113h under the control of the image pickup circuit 111.

Figure 3:
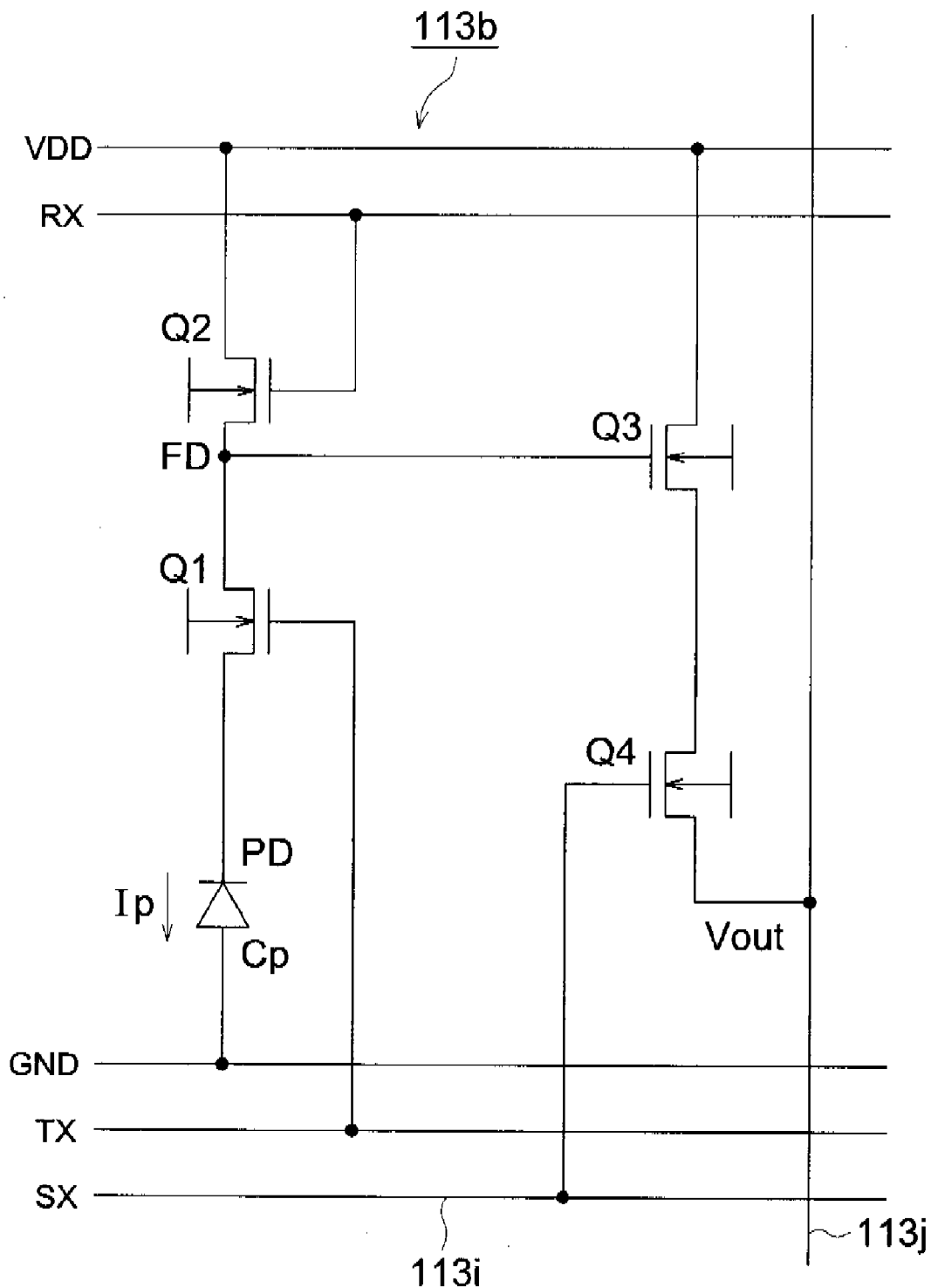
FIG. 3 is a circuit diagram showing an example of a circuit constitution of pixels composing the image pickup device according to the embodiment of the present invention.

Then, an example of the circuit constitution of the pixels 113b composing the image pickup device 113 will be explained by referring to FIG. 3. FIG. 3 is a circuit diagram showing an example of the circuit constitution of the pixels 113b composing the image pickup device 113.

In FIG. 3, the pixel 113b is made up of a photoelectric conversion element (hereinafter, referred to as PD) of a buried type photodiode structure and N-channel MOSFETs (metal-oxide semiconductor field-effect transistor, hereinafter referred to as a transistor) Q1 to Q4. The connection portion of the drain electrode of the transistor Q1 and the source electrode of the transistor Q2 is made up of a floating diffusion FD (hereinafter, referred to as FD). A reset signal RX, a transfer signal TX, and a readout signal SX indicate a control signal (potential) for each transistor, and VDD and GND indicate a power source and grounding respectively.

With respect to the PD, the anode thereof is grounded and the cathode thereof is connected to the source electrode of the transistor Q1. The PD generates an optical current Ip according to the incident light intensity from a photographic object and the optical current Ip is stored in a parasitic capacity Cp of the PD as a photoelectric charge Qp.

The transistor Q1 is a transfer transistor (hereinafter, referred to as TG) functioning as a charge removing transistor of the present invention, and the source electrode thereof is connected to the cathode of the PD, and the drain electrode thereof is connected to the connection portion or the FD of the source electrode of the transistor Q2 and the gate of the transistor Q3, and the gate thereof is connected to the transfer signal TX. The gate electric potential of the TG is controlled to an intermediate electric potential VM, and the incident light is thus photoelectrically converted into the optical current Ip of the PD by the linear-log characteristic, and then the gate electric potential is controlled to high electric potential VH, and the photoelectric charge Qp stored in the PD is thus transferred perfectly to the FD. If the electric charge is accumulated at the lower electric potential of the TG instead of the intermediate electric potential, and the electric charge is transferred at a high electric potential of the TG, the photoelectric conversion characteristic only have the ordinary linear characteristic.

The FD functions as a charge holding section of the present invention and is used to read the photoelectric charge Qp stored in the PD transferred by the TG.

The transistor Q2 is a reset transistor (hereinafter, referred to as RG), and the drain electrode thereof is connected to the power source VDD, the source electrode thereof to the FD, and the gate thereof to the reset signal RX. When the gate electric potential of the RG is controlled to the high potential VH, the FD is reset to the power source VDD.

The transistor Q3 is an amplifier transistor composing the source follower amplifier circuit, and the drain electrode thereof is connected to the power source VDD, the source electrode thereof to the drain electrode of the transistor Q4, and the gate thereof to the FD, and the electric potential of the FD is current-amplified, thus the transistor Q3 functions to lower the output impedance.

The drain electrode of the transistor Q3 and the drain electrode of the transistor Q2 (RG) are connected to the same electric potential of the power source VDD, so that the drain electrodes of the transistors Q3 and Q2 do not need to be isolated, and the area of the transistors can be made accordingly smaller, thus this arrangement contributes to miniaturization of the pixels and improvement of the aperture ratio. Further, the wirings of the drains can be shared, so that the wires can be laid out simply and it contributes to miniaturization of the pixels and improvement of the aperture ratio.

The transistor Q4 is a readout transistor for reading out output, and the drain electrode thereof is connected to the source electrode of the transistor Q3, the source electrode thereof to a vertical signal line 113*j*, and the gate thereof to the readout signal SX. If the gate electric potential of the transistor Q4 is controlled to the high electric potential VH, the potential of the FD is controlled to a low impedance via the transistor Q3 and is derived to the vertical signal line 113*j* as an output signal Vout. The transistors Q3 and Q4 compose a readout section of the present invention.

Figure 4:
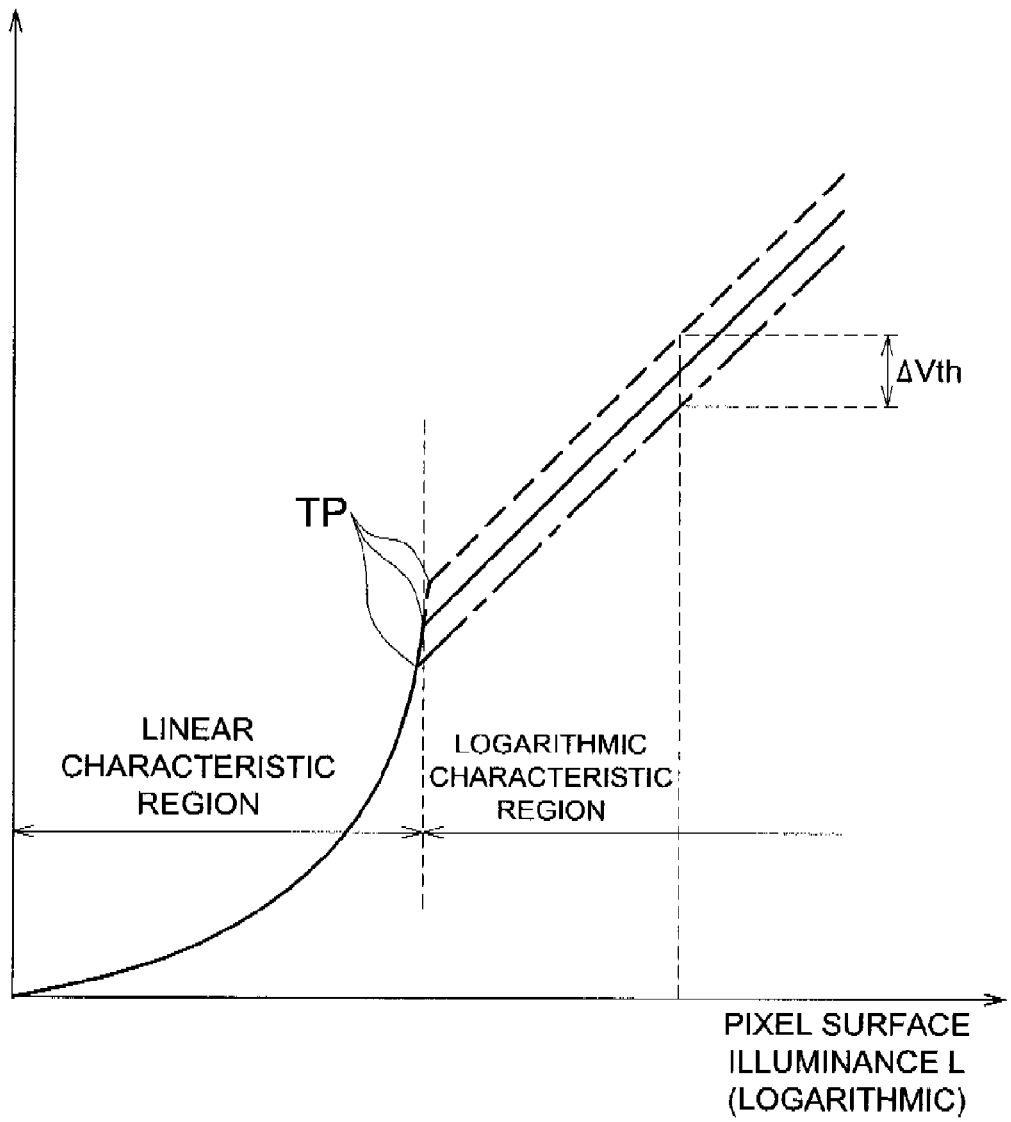
FIG. 4 is a schematic graph of the photoelectric conversion characteristic showing the linear-log characteristic of the pixel shown in FIG. 3.

Next, the photoelectric conversion characteristic of the pixel 113*b* shown in FIG. 3 will be explained by referring to FIG. 4. FIG. 4 is a schematic graph of the photoelectric conversion characteristic showing the linear-log characteristic of the pixel 113*b* shown in FIG. 3. The axis of abscissas indicates the logarithmic axis of pixel surface illuminance L by light entering the pixel 113*b* and the axis of ordinate indicates the linear axis of the aforementioned output signal Vout of the pixel 113*b*.

In FIG. 4, in the low illuminance region of the pixel surface illuminance L, the output signal Vout is proportional to the pixel surface illuminance L (linear characteristic region). In the high illuminance region of the pixel surface illuminance L, the output signal Vout is proportional to the logarithm of the pixel surface illuminance L (logarithmic characteristic region). Here, assuming the inflection point as TP, the inflection point TP varies for each pixel by a variation ΔVth of the threshold Vth of the transistor Q1 (TG) while performing the logarithmic conversion shown in FIG. 3, and in the logarithmic characteristic region, an error ΔVth occurs in the output signal Vout with respect to the same pixel surface illuminance L. The error ΔVth is visible as a fixed pattern noise in an image. The present invention proposes a method for eliminating a variation in the inflection point TP for each pixel or the error ΔVth of the output signal Vout.

Figure 5:
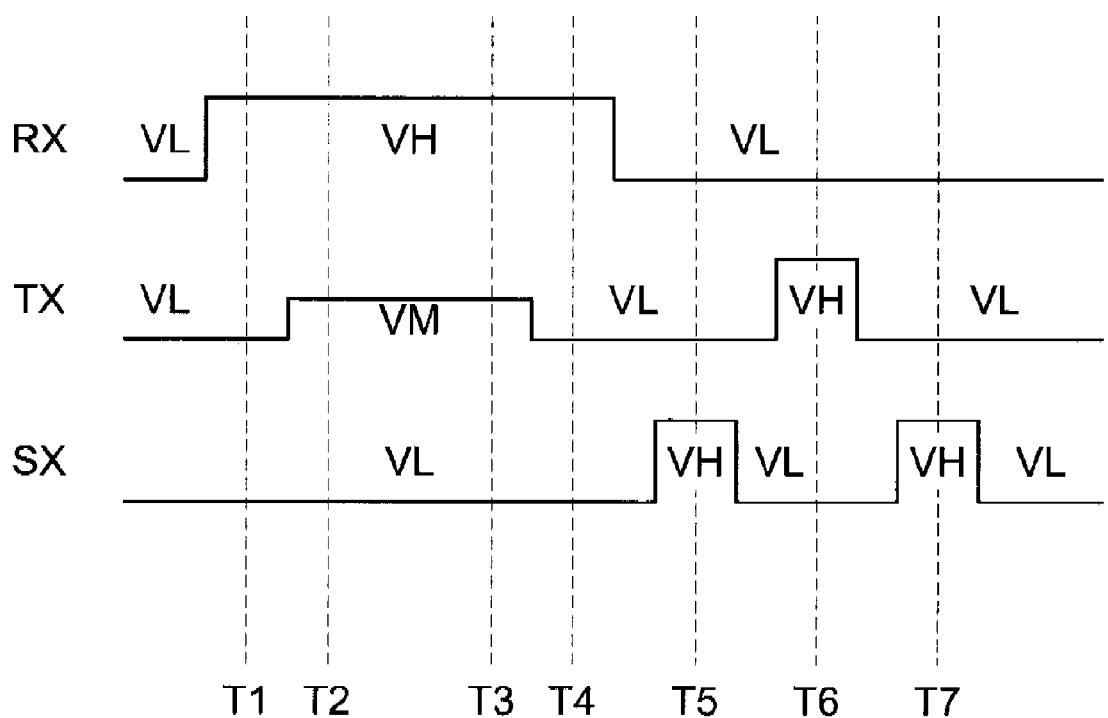
FIG. 5 is a diagram showing the timing chart of a conventional method for driving the pixel shown in FIG. 3 as a linear-log sensor.

Here, the conventional method for driving the pixel 113*b* shown in FIG. 3 as a linear-log sensor will be explained by referring to FIGS. 5 to 12. FIG. 5 is a timing chart showing the conventional method for driving the pixel 113*b* as a linear-log sensor and FIGS. 6 to 12 are schematic diagrams showing the potential of each portion of the pixel 113*b* at each timing from the timing T1 to the timing T7 shown in FIG. 5.

Figure 6:
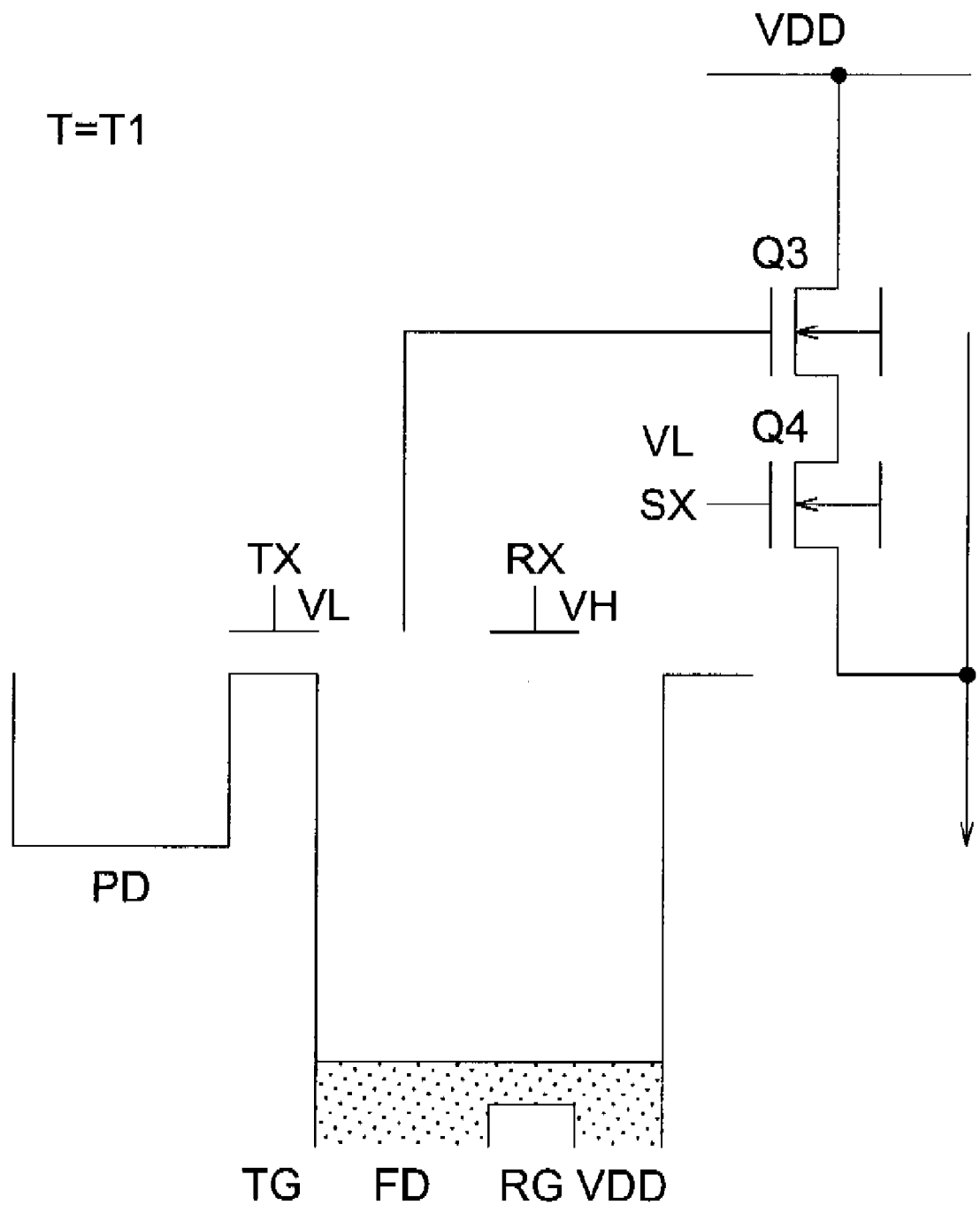
FIG. 6 is a schematic diagram showing the potential of each pixel portion at the timing T1 shown in FIG. 5.

At the timing T1 shown in FIG. 5, the reset signal RX is set to the high potential VH, so that the RG is turned on and the FD is reset to the power source VDD. The state of the potential of each portion at this time is shown in FIG. 6. In FIG. 6, the PD is depleted by the preceding complete transfer (at the timing T6 which will be described later) of the photoelectric charge Qp stored in the PD to the FD. On the other hand, the FD is reset to the power source VDD.

Figure 7:
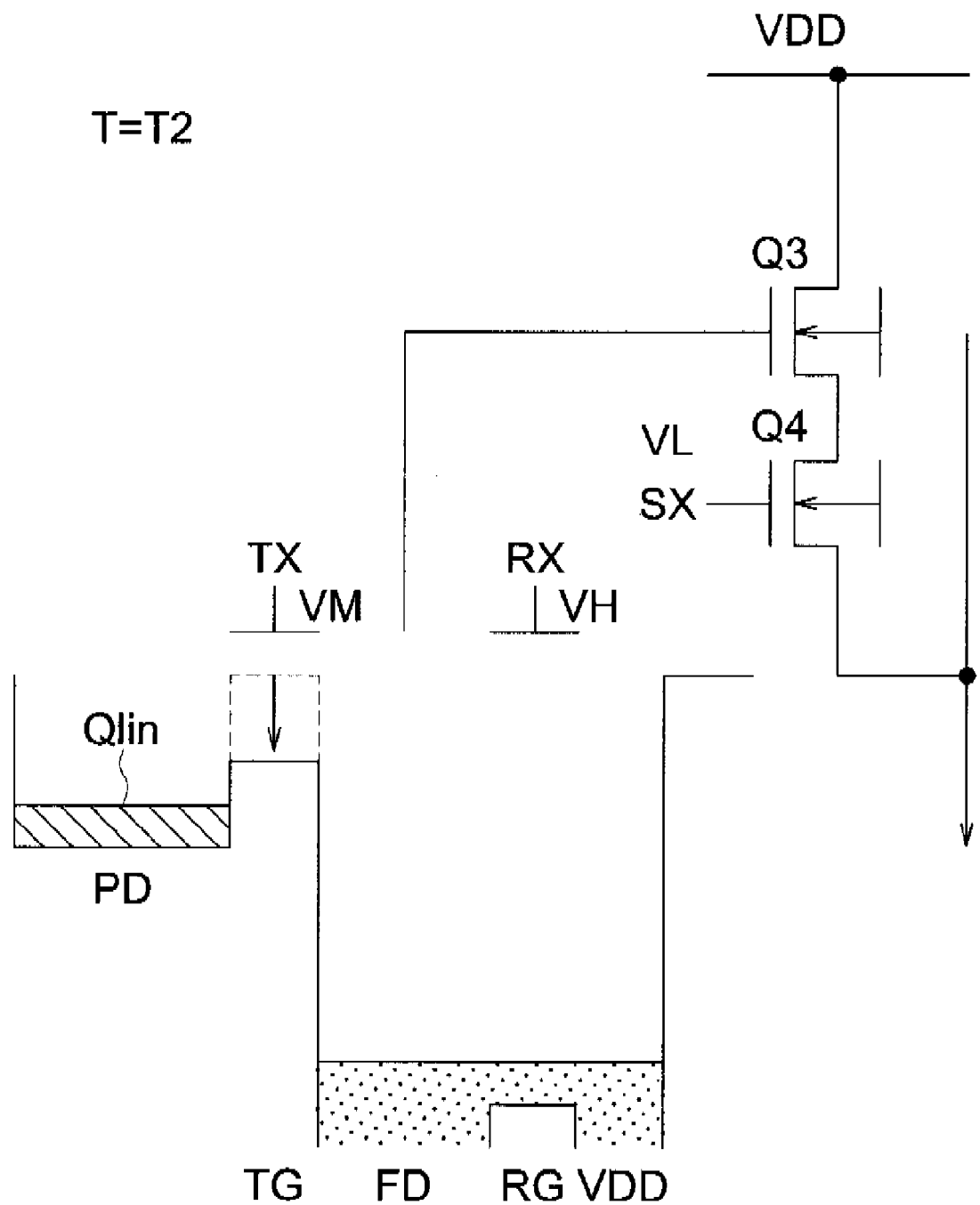
FIG. 7 is a schematic diagram showing the potential of each pixel portion at the timing T2 shown in FIG. 5.

The timing T2 shown in FIG. 5 is in the state immediately after the start of accumulating the photoelectric charge Qp in the PD, and the transfer signal TX is set at the intermediate potential VM for the logarithmic conversion. To reset the charge having leaked from the PD to the FD, the FD is reset to the power source VDD similarly to the timing T1. The state of the potential of each portion at this time is shown in FIG. 7. In FIG. 7, an photoelectric charge Qlin of the linear characteristic has just started to accumulate in the PD. The electric potential of the TG is being set at the intermediate value. The FD is being reset to the power source VDD.

Figure 8:
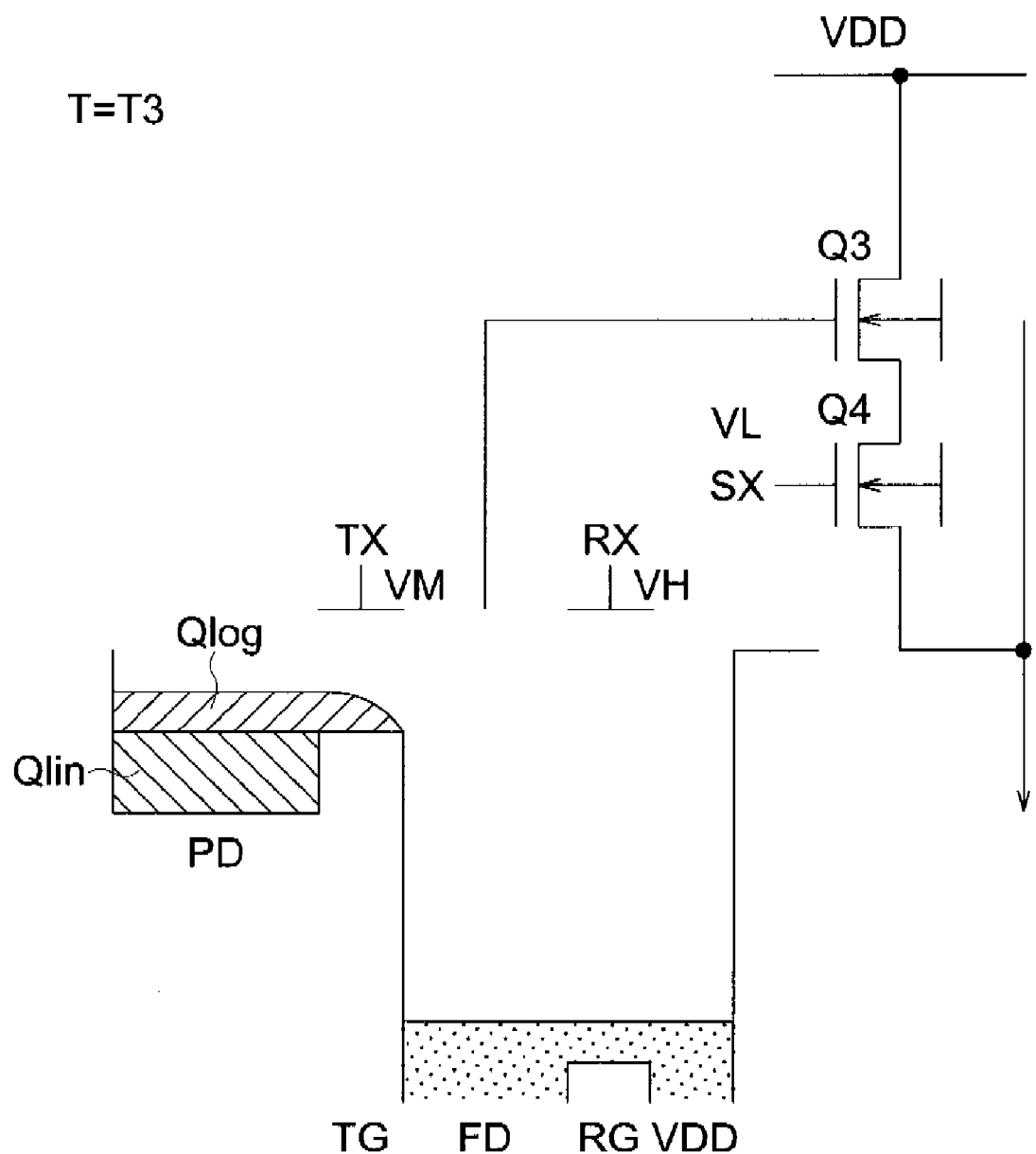
FIG. 8 is a schematic diagram showing the potential of each pixel portion at the timing T3 shown in FIG. 5.

The timing T3 shown in FIG. 5 is in the state that the photoelectric charge Qp is accumulating in the PD, and the state of each control signal is the same as that at the timing T2. The state of the potential of each portion at this time is shown in FIG. 8. In FIG. 8, in the PD, the photoelectric charge Qlin of the linear characteristic has already accumulated up to the potential of the TG, and a part of the photoelectric charge exceeding the potential of the TG is leaking into the FD. And, an photoelectric charge Qlog of the log characteristic converted logarithmically remains in the PD.

Figure 9:
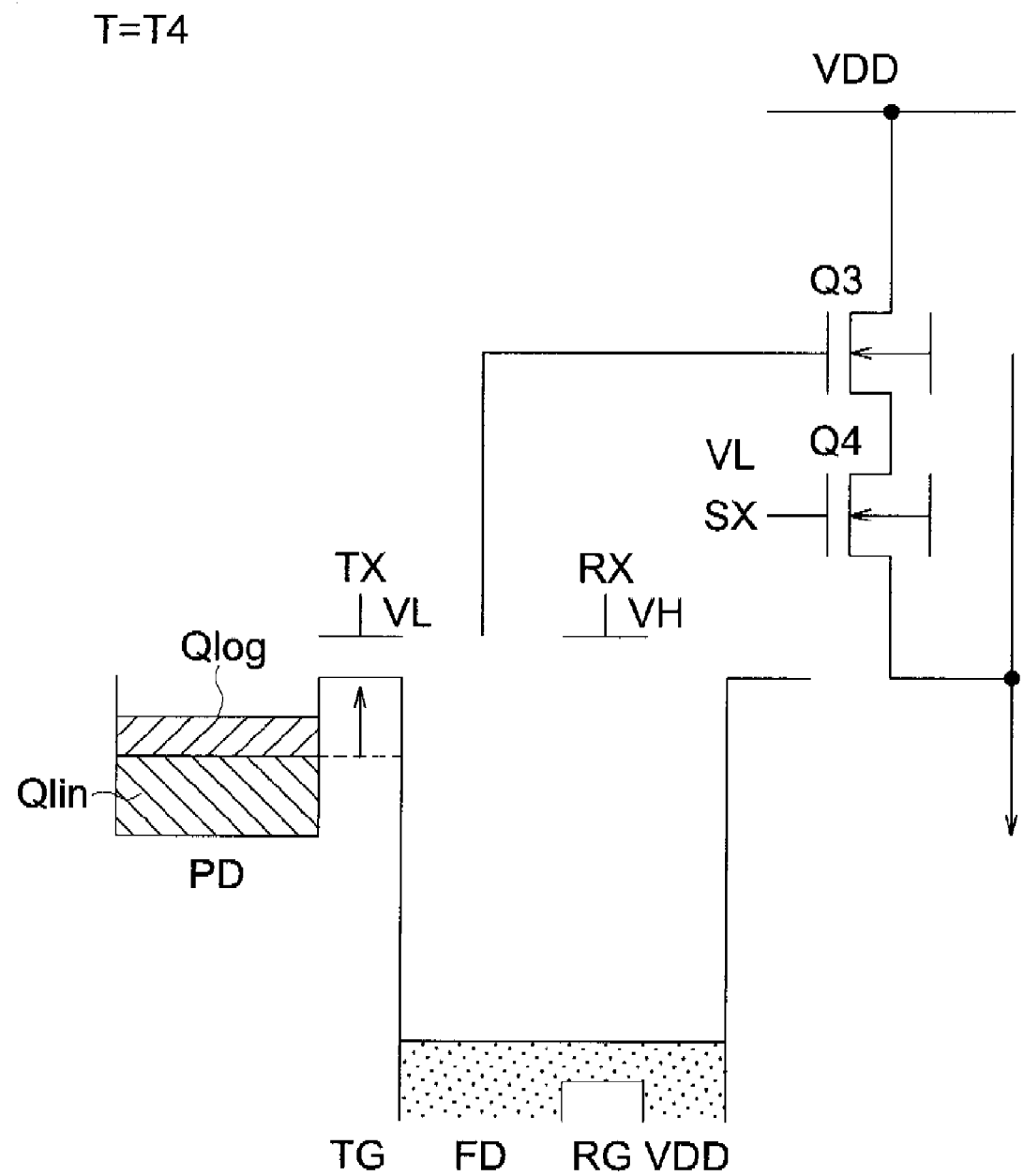
FIG. 9 is a schematic diagram showing the potential of each pixel portion at the timing T4 shown in FIG. 5.

The timing T4 shown in FIG. 5 is in the state that the accumulation of the photoelectric charge Qp is finished, and the transfer signal TX is returned to the low electric potential VL to close the TG. The reset signal RX is kept at the high potential VH and the FD is kept reset to the power source VDD. The status of the potential of each portion at this time is shown in FIG. 9. In FIG. 9, in the PD, the photoelectric charge Qlin of the linear characteristic and the photoelectric charge Qlog of the log characteristic are stored. The FD is kept reset to the power source VDD.

Figure 10:
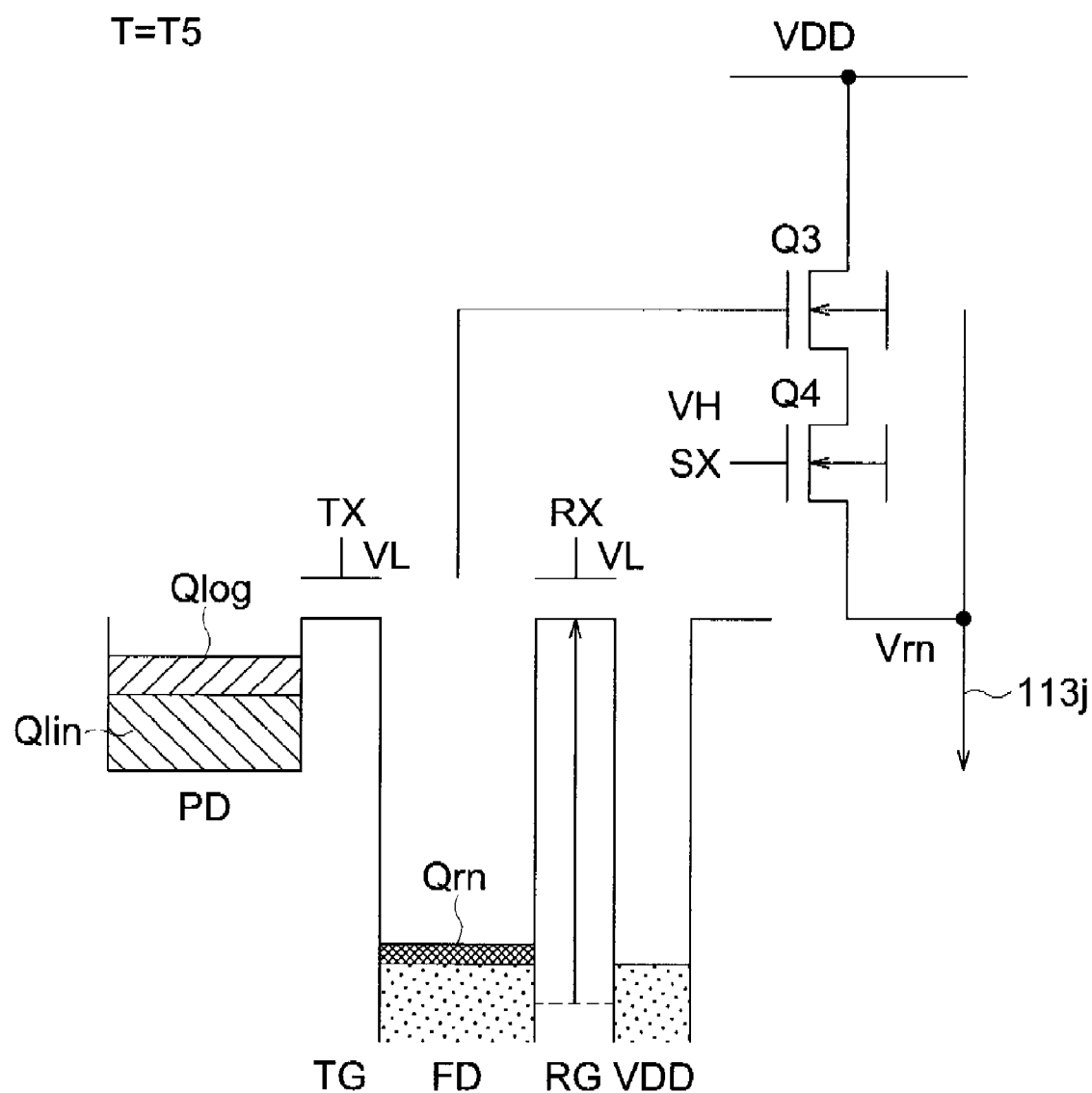
FIG. 10 is a schematic diagram showing the potential of each pixel portion at the timing T5 shown in FIG. 5.

The timing T5 shown in FIG. 5 is in the state of reading the reset noise of the FD, and the reset signal RX is set at the low electric potential VL, and the RG is closed, and the readout signal SX is set at the high electric potential VH, and a noise charge Qrn caused by the reset operation remaining in the FD is read out onto the vertical signal line 113*j* as a noise signal Vrn. The state of the potential of each portion at this time is shown in FIG. 10. In FIG. 10, the state of the PD is the same as that shown in FIG. 9. The reset signal RX is kept at the low electric potential VL, and the RG is closed, and the noise charge Qrn remaining in the FD is read out onto the vertical signal line 113*j* as the noise signal Vrn.

Figure 11:
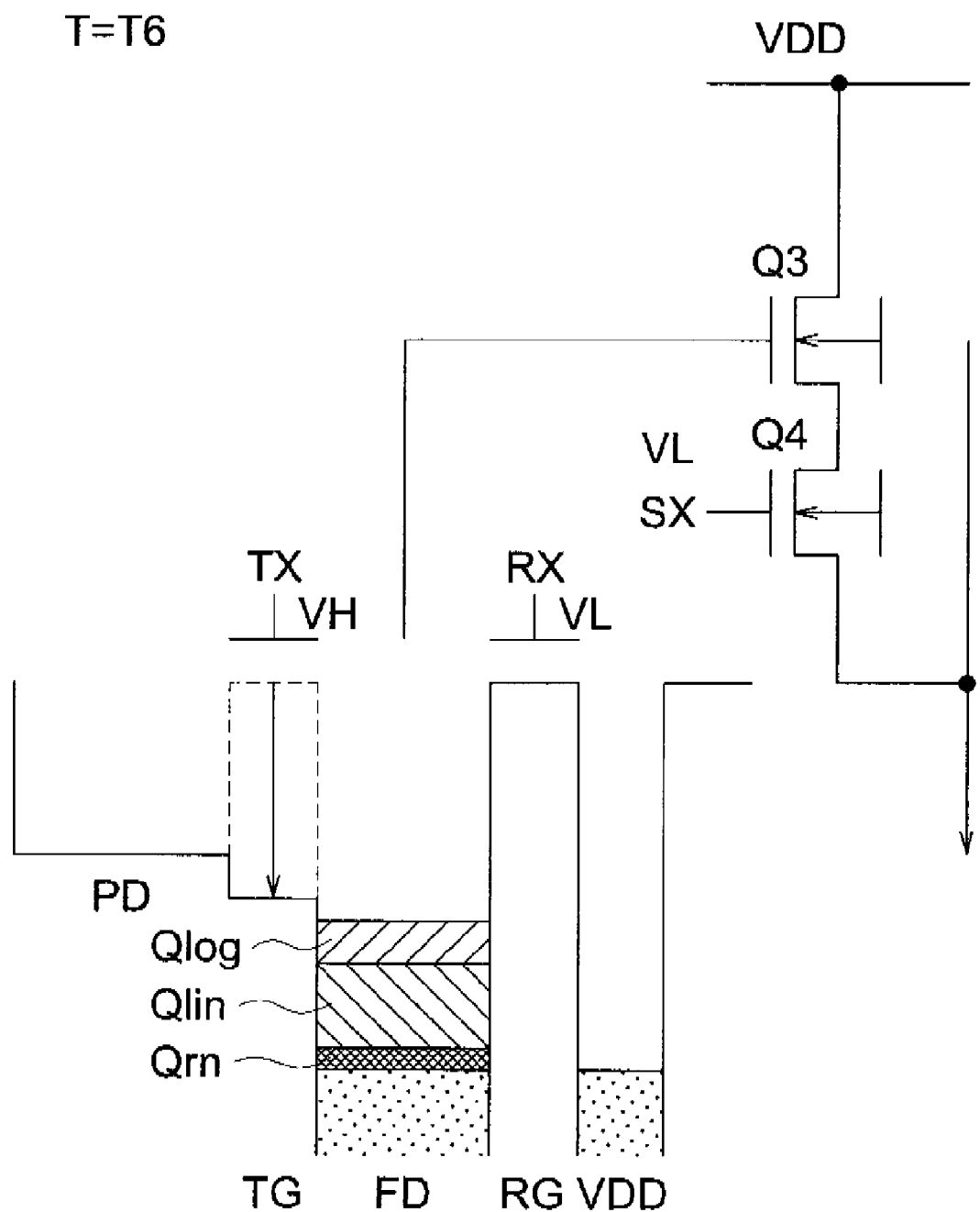
FIG. 11 is a schematic diagram showing the potential of each pixel portion at the timing T6 shown in FIG. 5.

The timing T6 shown in FIG. 5 is in the state that the photoelectric charge Qp stored in the PD is transferred to the FD, and the transfer signal TX is set at the high electric potential VH, so that the photoelectric charge Qn stored in the PD is transferred perfectly to the FD. The state of the potential of each portion at this time is shown in FIG. 11. In FIG. 11, the transfer signal TX is controlled to be the high electric potential VH, thus the potential of the TG is lowered than the lowest value of the potential of the PD, so that the photoelectric charge Qlin of the linear characteristic stored in the PD and the photoelectric charge Qlog of the log characteristic are transferred perfectly to the FD. In the FD, stored is a charge in which the photoelectric charge Qlin of the linear characteristic and the photoelectric charge Qlog of the log characteristic are superimposed on the remaining noise charge Qrn.

The timing T7 shown in FIG. 5 is in the state of reading the output signal of the pixel, and the transfer signal TX is returned to the low electric potential VL to close the TG, and the readout signal SX is set at the high electric potential VH, and the charge which is held in the FD and in which the photoelectric charge Qlin of the linear characteristic and the photoelectric charge Qlog of the log characteristic are superimposed on the noise charge Qrn is read out onto the vertical signal line 113*j* as an output signal Vout. Here, the output signal Vout is a signal in which a signaling signal Vsig which is a desired output is added to the aforementioned noise signal Vrn (Vout=Vsig+Vrn). The state of the potential of each portion at this time is shown in FIG. 12.

Figure 12:
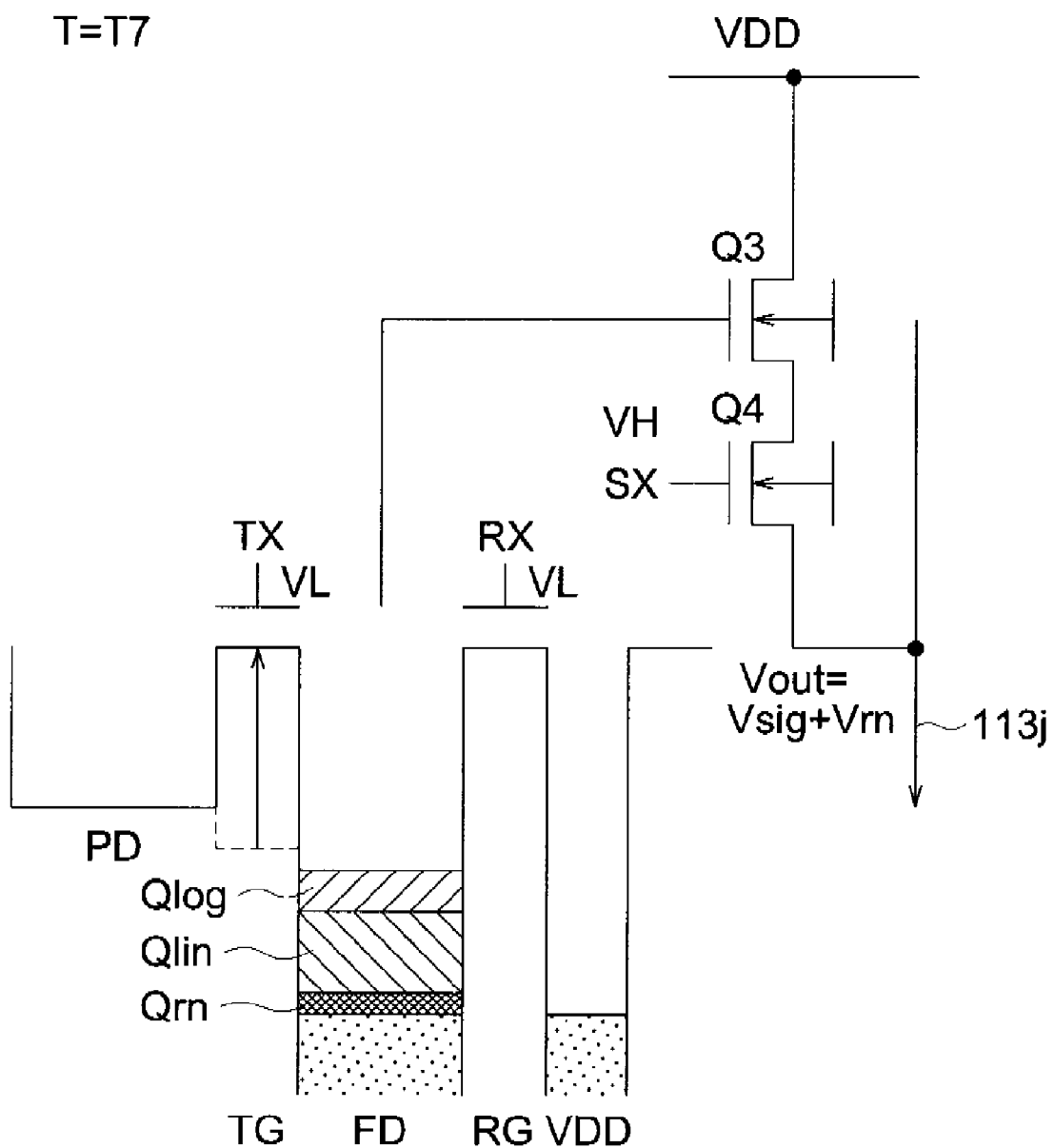
FIG. 12 is a schematic diagram showing the potential of each pixel portion at the timing T7 shown in FIG. 5.

In FIG. 12, the transfer signal TX is returned to the low electric potential VL to close the TG, and the readout signal SX is set at the high electric potential VH, and the charge held in the FD is read out as Vout. The charge stored in the PD at the timing T6 is transferred perfectly to the FD, so that the PD is depleted. The PD is returned again from the state of the timing T7 to the status of the timing T1, and the next photoelectric charge Qp is to be stored.

From the noise signal Vrn read out at the timing T5 and the output signal Vout read out at the timing T7, the difference between them is taken out by the sample hold circuit, for example, 113*d* shown in FIG. 2, and the signaling signal Vsig which is a desired output is obtained (Vout−Vrn=Vsig).

Figure 13:
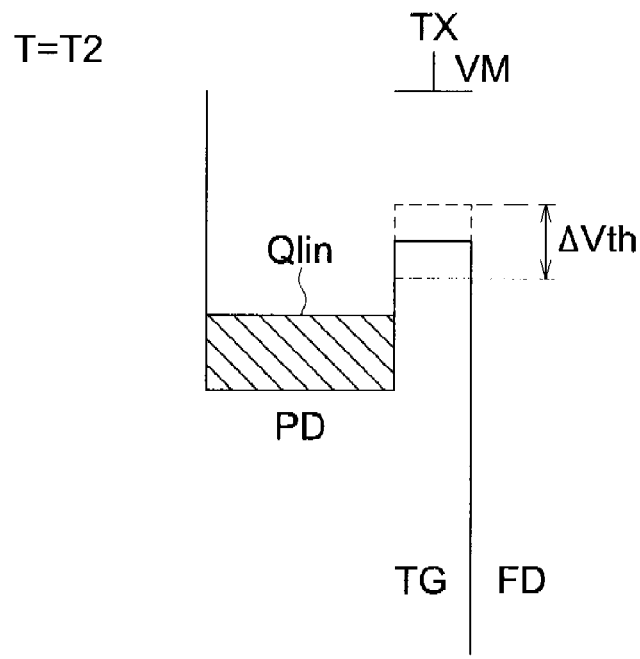
FIG. 13 is an enlarged view of the potential in the neighborhood of the PD and TG shown in FIG. 7.

Although the signaling signal Vsig as a linear-log sensor is obtained by the aforementioned operation, as described in FIG. 4, the inflection point TP varies with variations in the threshold Vth of the transistor Q1 (TG). How the variation occurs will be explained by referring to FIG. 13. FIG. 13 is an enlarged view of the potentials in the neighborhood of the PD and TG shown in FIG. 7.

In FIG. 13, although the transfer signal TX, which is applied to the transistors Q1 (TG) of all the pixels 113b, is set at the electric potential VM, the potential of the channel of the TG varies by ΔVth due to the variation ΔVth of the threshold of the TG. Therefore, the inflection point has the variation of ΔVth between pixels.

Figure 14:
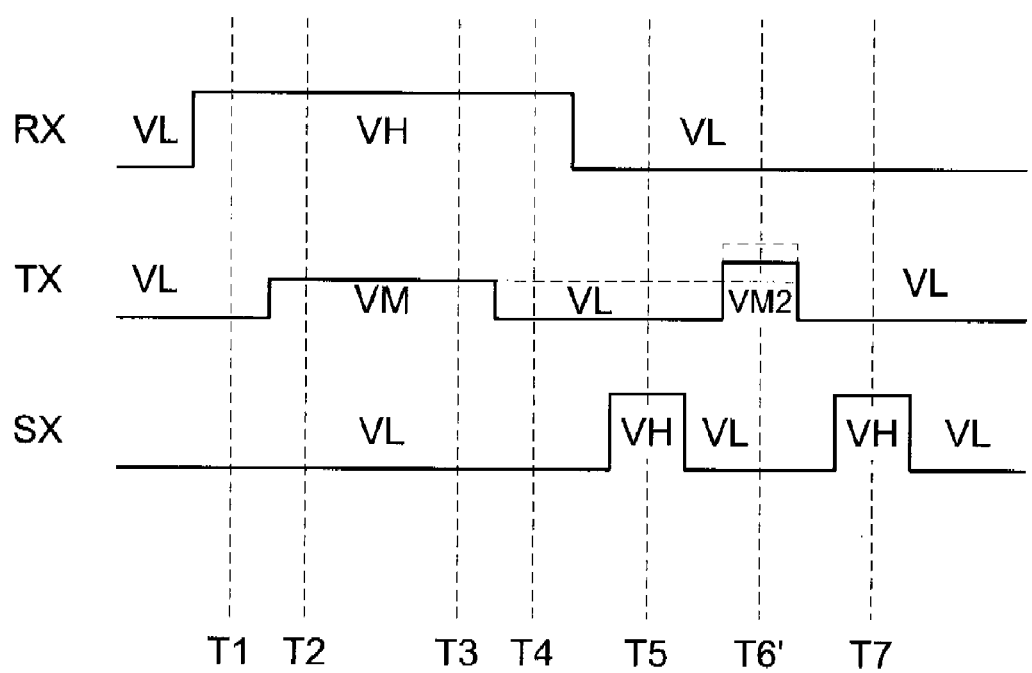
FIG. 14 is a timing chart showing a first embodiment of the present invention for driving the pixel shown in FIG. 3 as a linear-log sensor.

Next, the first embodiment of the present invention will be explained by referring to FIGS. 14 to 17. FIG. 14 is a timing chart showing the first embodiment of the present invention for driving the pixel 113b shown in FIG. 3 as a linear-log sensor.

In FIG. 14, the operation at each timing is the same as that shown in FIG. 5 except for the timing T6'. At the timing T6 shown in FIG. 5, the transfer signal TX is set at the high electric potential VH, while it is set at a second intermediate electric potential VM2 in FIG. 14.

Figure 15:
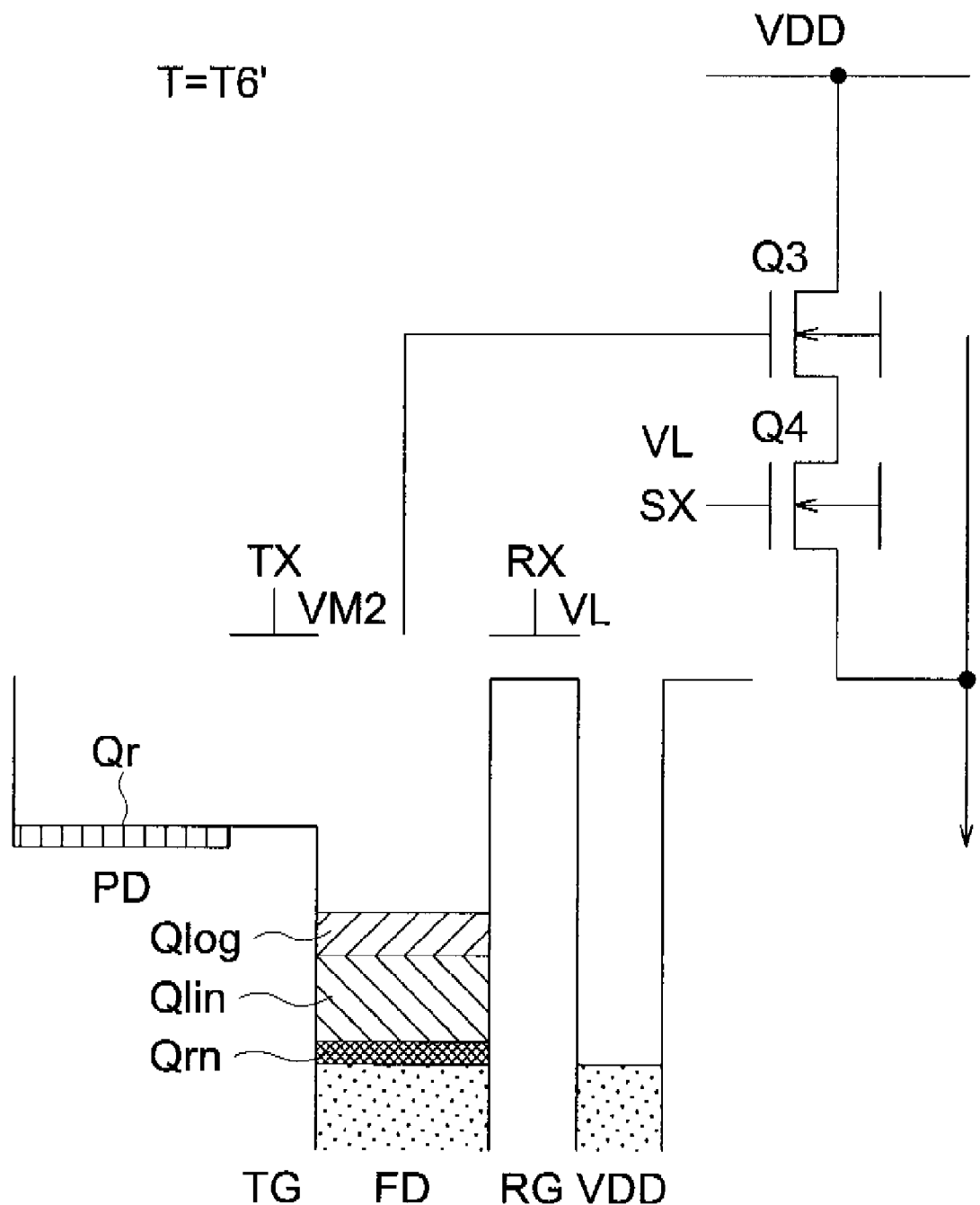
FIG. 15 is a schematic diagram showing the potential of each portion at the timing T6' shown in FIG. 14.

FIG. 15 is a schematic diagram showing the potential of each portion at the timing T6' shown in FIG. 14.

In FIG. 15, at the timing T6', the transfer signal TX is set to the second intermediate electric potential VM2. The second intermediate electrical potential VM2 is set such that the potential of the channel of the TG is higher than the minimum potential of the PD even in the pixel in which the potential of the channel of the TG, which is varied due to the variation ΔVth of the threshold of the TG, is the lowest. Therefore, the electric potential of the channel of the TG is higher than the minimum potential of the PD in the standard pixel, so that the photoelectric charge Qp (=Qlog+Qlin) stored in the PD is not completely transferred to the FD, and a part of the photoelectric charge Qp remains in the PD as a residual charge Qr, whose amount depends on the variation ΔVth of the threshold.

Figure 16:
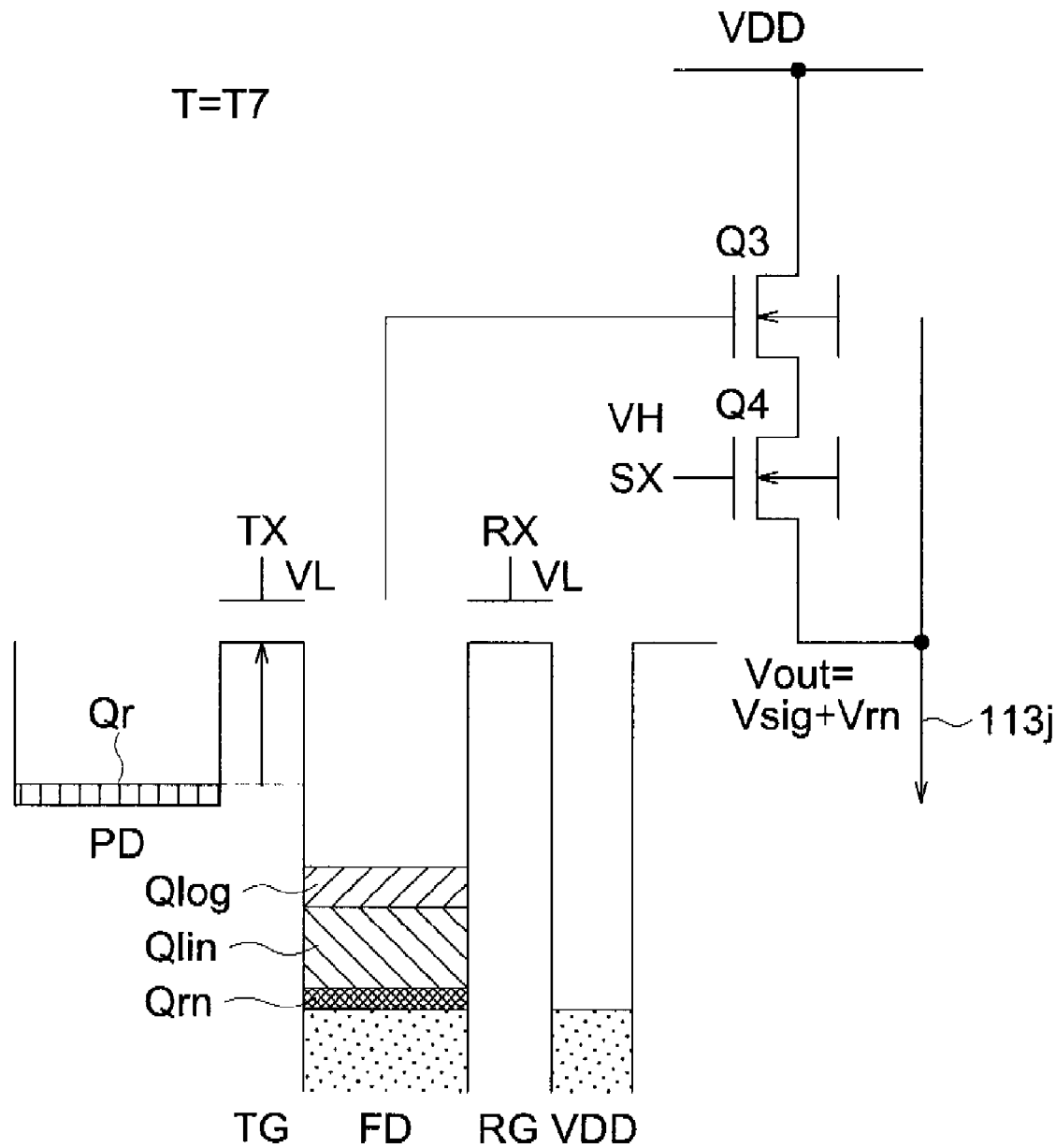
FIG. 16 is a schematic diagram showing the potential of each portion at the timing T7' shown in FIG. 14.

FIG. 16 is a schematic diagram showing the potential of each portion at the timing T7 shown in FIG. 14. Except that the residual charge Qr remains in the PD, it is the same as that shown in FIG. 12, and the output signal Vout (=Vsig+Vrn) is read out onto the vertical signal line 113j.

Figure 17:
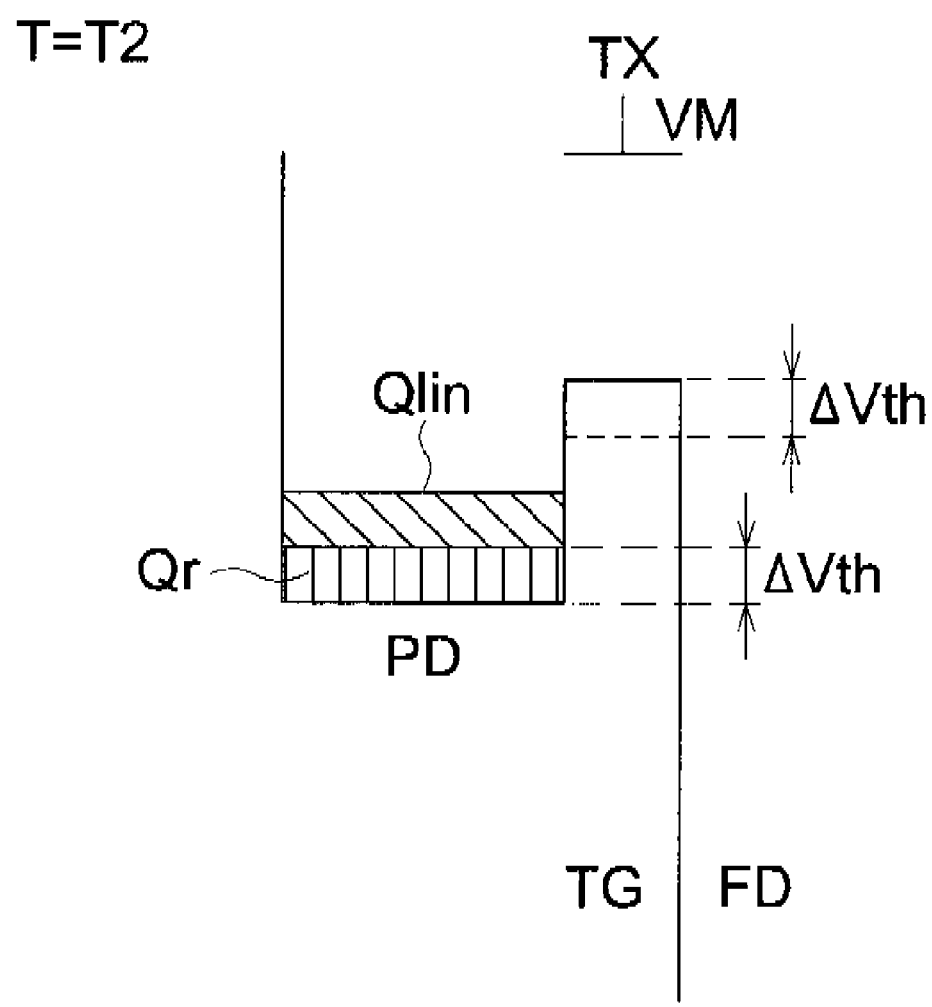
FIG. 17 is a schematic diagram showing the potentials at the PD and TG at the timing T2 shown in FIG. 14.

FIG. 17 is a schematic diagram showing the potential of the PD and TG at the timing T2 shown in FIG. 14. Unlike FIG. 13, the residual charge Qr according to the variation ΔVth of the threshold remains in the PD, and the photoelectric charge Qlin of the linear characteristic is superimposed and stored on the residual charge Qr. The potential due to the residual charge Qr is equivalent to the variation ΔVth of the threshold of the TG, so that after all, the height of the wall of the potential of the channel of the TG for deciding the storage amount of the photoelectric charge Qlin of the linear characteristic is the same in all the pixels 113b. Therefore, variations in the inflection point caused by variations in the threshold of the TG can be canceled.

As mentioned above, according to the first embodiment of the present invention, when transferring the photoelectric charge Qp stored in the PD to the FD, if the transfer signal TX is set to the second intermediate electric potential VM2, a part of the photoelectric charge Qp stored in the PD remains in the PD as a residual charge Qr depending on the variation ΔVth of the threshold of the TG. Therefore, the height of the wall of the potential of the channel of the TG can be made equal in all the pixels 113b, so that variations in the inflection point caused by the variation ΔVth of the threshold of the TG can be canceled.

Figure 18:
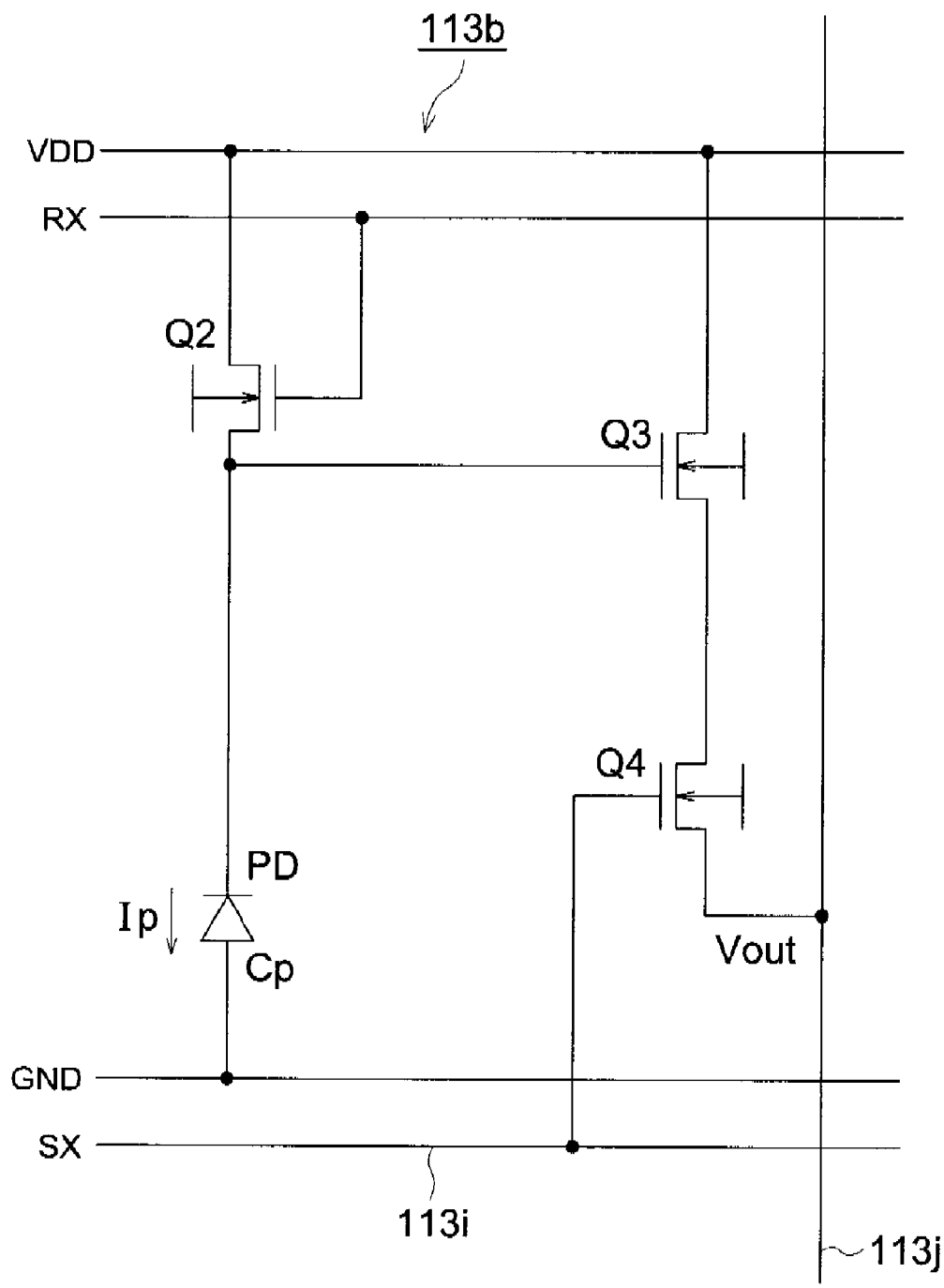
FIG. 18 is a circuit diagram showing another example of the circuit constitution of pixels composing the image pickup device relating to an embodiment of the present invention.

Next, another example of the circuit constitution of the pixels 113b constituting the image pickup device 113 will be explained by referring to FIG. 18. FIG. 18 is a circuit diagram showing another example of the circuit constitution of the pixels 113b constituting the image pickup device 113. In FIG. 3, the four transistors Q1 to Q4 are used for one pixel, while in FIG. 18, a 3-transistor constitution using the transistors Q2 to Q4 for one pixel without the transistor Q1 is used.

In FIG. 18, the pixel 113b is made up of a photoelectric conversion element (hereinafter, referred to as PD) of a surface type PN junction photodiode structure and N-channel MOSFETs (metal-oxide semiconductor field-effect transistor, hereinafter referred to as transistor) Q2 to Q4. The reset signal RX and readout signal SX indicate a control signal (potential) for each transistor, and VDD and GND indicate a power source and grounding respectively.

With respect to the PD, the anode thereof is grounded and the cathode thereof is connected to the connection portion of the source electrode of the transistor Q2 and the gate of the transistor Q3. The PD generates an optical current Ip according to the incident light intensity from a photographic object, and the optical current Ip is stored in a parasitic capacity Cp of the PD as an photoelectric charge Qp.

The transistor Q2 is a reset transistor (hereinafter, referred to as RG) functioning as a charge removing transistor of the present invention, and the drain electrode thereof is connected to the power source VDD, and the source electrode thereof is connected to the cathode of the PD, and the gate thereof is connected to the reset signal RX. The gate electric potential of the RG is set to the high electric potential VH, thus the PD is reset to the power source VDD, and when it is set to the intermediate electric potential VM, the optical current Ip of the PD is converted photoelectrically by the linear-log characteristic.

The transistor Q3 is an amplifier transistor constituting the source follower amplifier circuit, and the drain electrode thereof is connected to the power source VDD, the source electrode thereof to the drain electrode of the transistor Q4, and the gate thereof to the contact point of the cathode of the PD and the source electrode of the RG, and the electric potential of the cathode of the PD is current-amplified, thus the transistor Q3 functions to lower the output impedance.

The drain electrode of the transistor Q3 and the drain electrode of the transistor Q2 (RG) are connected to the same electric potential of the power source VDD, so that the drain electrodes of the transistors Q3 and Q2 do not need to be isolated, and the area of the transistors can be made accordingly smaller, thus it contributes to miniaturization of the pixels and improvement of the aperture ratio. Further, the wirings can be shared, so that the wiring can be laid out simply and it contributes to miniaturization of the pixels and improvement of the aperture ratio.

The transistor Q4 is a readout transistor for reading output, and the drain electrode thereof is connected to the source electrode of the transistor Q3, the source electrode thereof to the vertical signal line 113j, and the gate thereof to the readout signal SX. If the gate electric potential of the transistor Q4 is controlled to the high electric potential VH, the electric potential of the cathode of the PD is made to have low impedance through the transistor Q3 and is derived to the vertical signal line 113j as an output signal Vout. The transistors Q3 and Q4 compose a readout section of the present invention.

Figure 19:
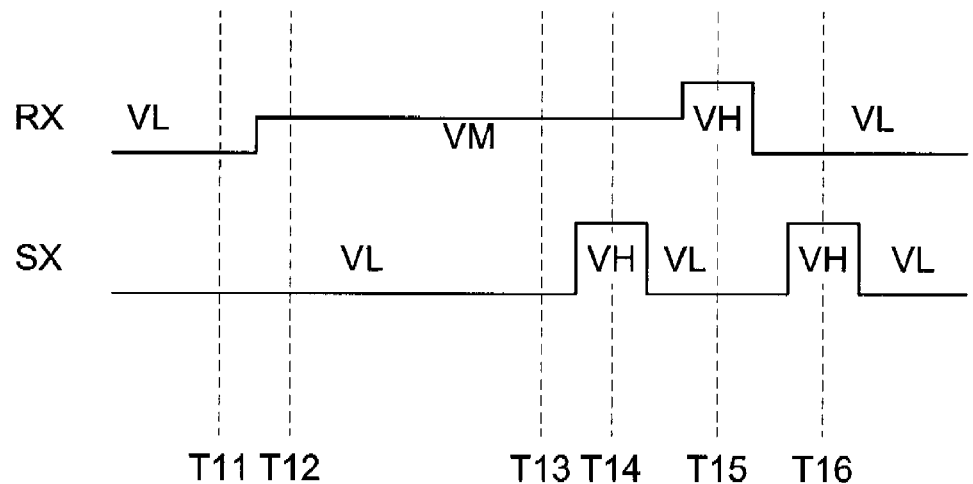
FIG. 19 is a timing chart showing a conventional method for driving the pixel shown in FIG. 18 as a linear-log sensor.

Here, the conventional method for driving the pixel 113 shown in FIG. 18 as a linear-log sensor will be explained by referring to FIGS. 19 to 26. FIG. 19 is a timing chart showing the conventional method for driving the pixel 113b shown in FIG. 18 as a linear-log sensor, and FIGS. 20 to 26 are schematic diagrams showing the potential of each portion of the pixel 113b at each timing from the timing T11 to the timing T16 shown in FIG. 19.

Figure 20:
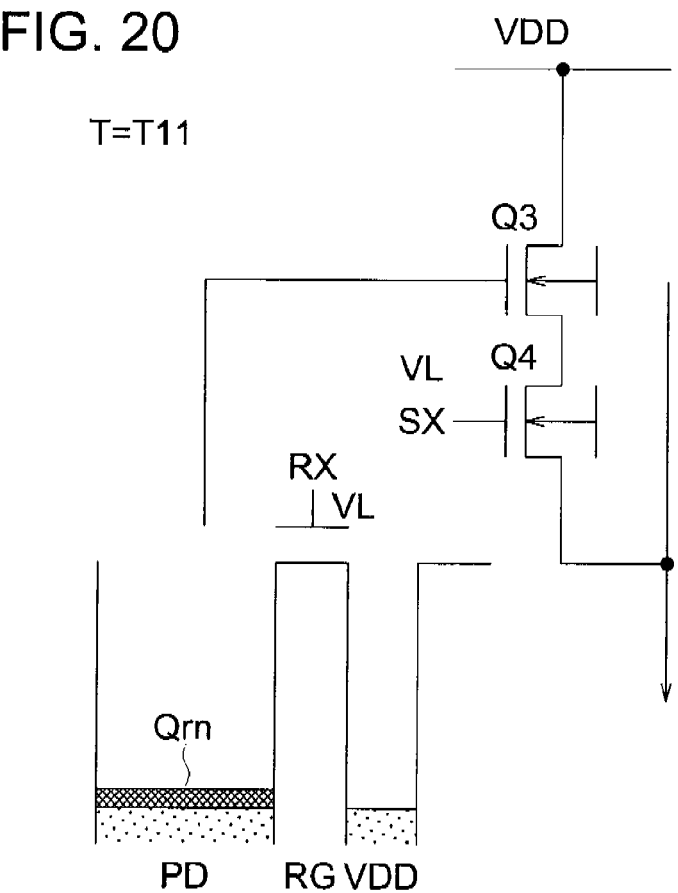
FIG. 20 is a schematic diagram showing the potential of each pixel portion at the timing T11 shown in FIG. 19.

At the timing T11 shown in FIG. 19, both the reset signal RX and readout signal SX are set at the low electric potential VL. The state of the potential of each portion at this time is shown in FIG. 20. In FIG. 20, the noise charge Qrn caused by the reset operation remains in the PD, which was once depleted by the preceding reset operation (the timing T15 which will be described later) of the PD.

Figure 21:
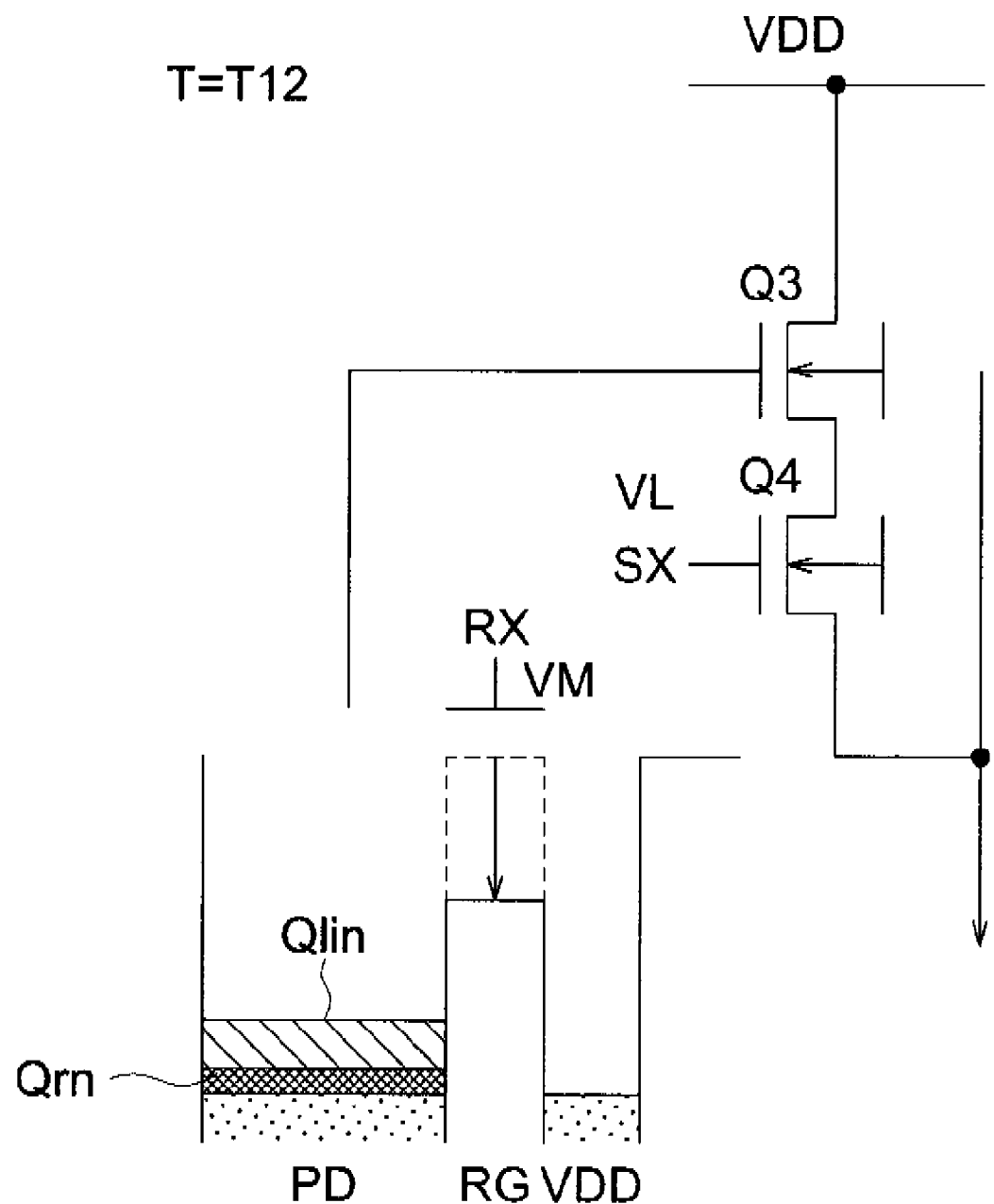
FIG. 21 is a schematic diagram showing the potential of each pixel portion at the timing T12 shown in FIG. 19.

The timing T12 shown in FIG. 19 is in the state immediately after start of storing of the photoelectric charge Qp in the PD, and the reset signal RX is set at the intermediate electric potential VM for the logarithmic conversion. The readout signal SX is kept at the low electric potential VL. The status of the potential of each portion at this time is shown in FIG. 21. In FIG. 21, the photoelectric charge Qlin of the linear characteristic has started to accumulate in the PD being superimposed on the noise charge Qrn. The potential of the RG is set at the intermediate value.

Figure 22:
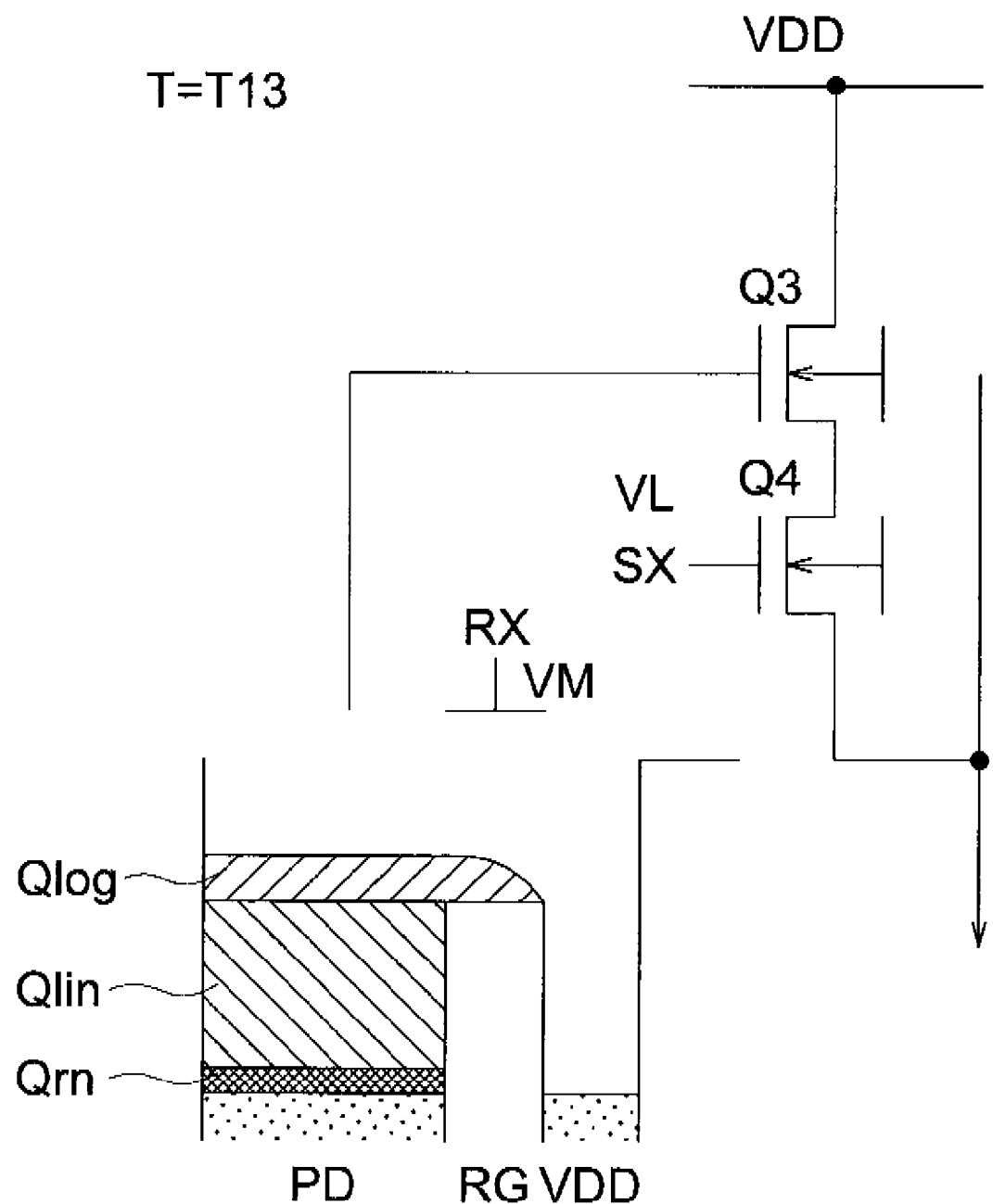
FIG. 22 is a schematic diagram showing the potential of each pixel portion at the timing T13 shown in FIG. 19.

The timing T13 shown in FIG. 19 is in the state that the photoelectric charge Qp is being stored in the PD, and the statuses of the reset signal RX and readout signal SX are the same as that at the timing T2. The state of the potential of each portion at this time is shown in FIG. 22. In FIG. 22, the photoelectric charge Qlin of the linear characteristic is already accumulated up to the potential of the RG in the PD being superimposed on the noise charge Qrn, and a part of the photoelectric charge exceeding the potential of the RG is leaking into the power source VDD. And, the logarithmically converted photoelectric charge Qlog remains in the PD.

Figure 23:
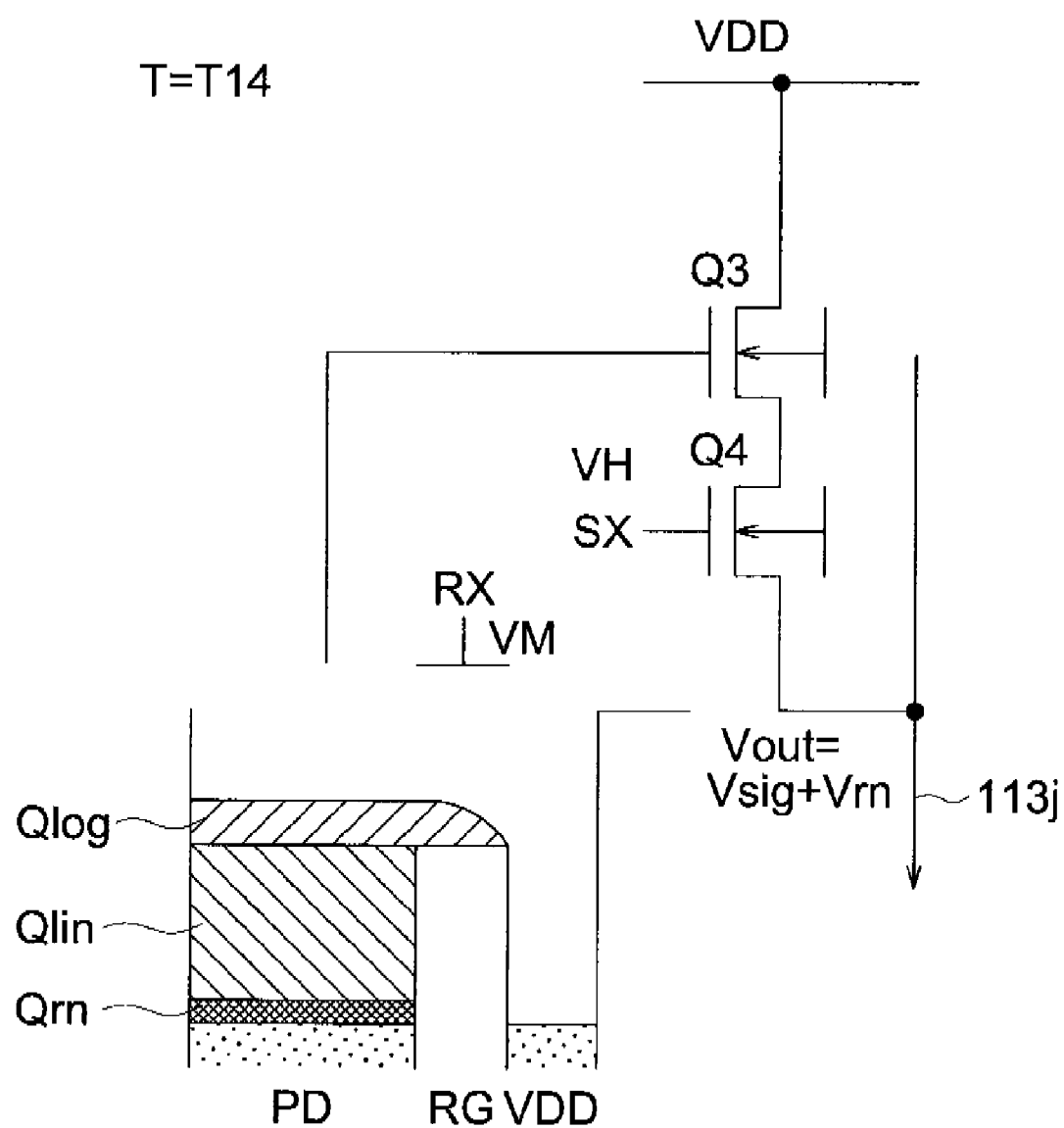
FIG. 23 is a schematic diagram showing the potential of each pixel portion at the timing T14 shown in FIG. 19.

The timing T14 shown in FIG. 19 is in the state of reading out the output signal of the pixel, and the reset signal RX is kept at the intermediate electric potential VM, and the readout signal SX is set at the high electric potential VH, and the charge, which is held in the PD and in which the photoelectric charge Qlin of the linear characteristic and the photoelectric charge Qlog of the log characteristic are superimposed on the noise charge Qrn, is read out onto the vertical signal line 113j as an output signal Vout. Here, the output signal Vout is a signal in which the signaling signal Vsig which is a desired output is added to the noise signal Vrn which will be described later in FIG. 25 (Vout=Vsig+Vrn). The state of the potential of each portion at this time is shown in FIG. 23. In FIG. 23, the readout signal SX is set at the high electric potential VH and the charge stored in the PD is read out as the Vout.

Figure 24:
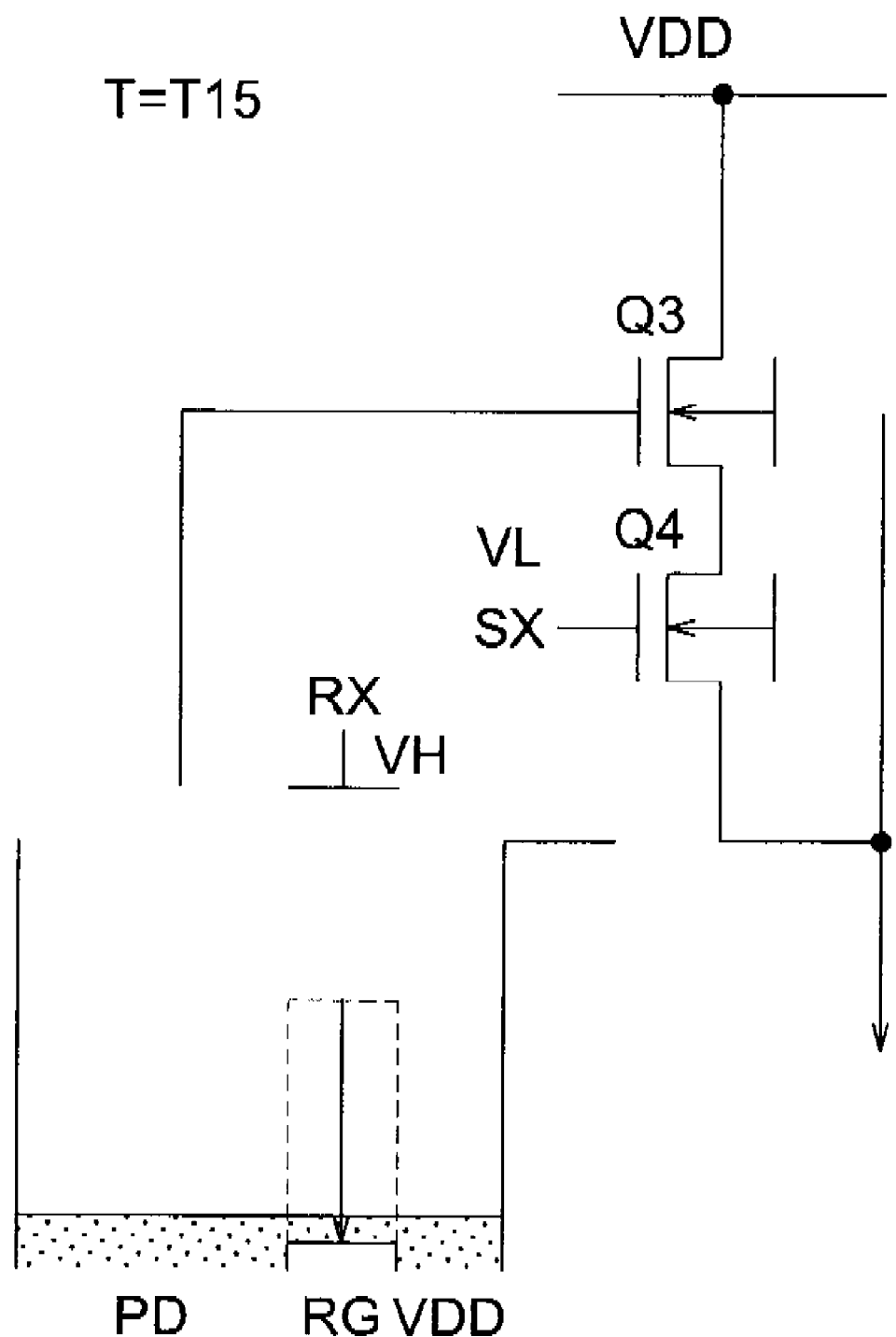
FIG. 24 is a schematic diagram showing the potential of each pixel portion at the timing T15 shown in FIG. 19.

The timing T15 shown in FIG. 19 is in the state that the photoelectric charge Qp stored in the PD is reset, and the reset signal RX is set at the high electric potential VH, and the PD is reset to the power source VDD. The readout signal SX has been returned to the low potential VL. The status of the potential of each portion at this time is shown in FIG. 24. In FIG. 24, the reset signal RX is set to the high electric potential VH, so that the potential of the RG is lowered, and the PD is reset to the power source VDD.

The timing T16 shown in FIG. 19 is in the state of reading reset noise of the PD, and the reset signal RX is set at the low electric potential VL to close the RG, and the readout signal SX is set at the high electric potential VH, and the noise charge Qrn caused by the reset operation and remaining in the PD is read out onto the vertical signal line 113j as a noise signal Vrn. The state of the potential of each portion at this time is shown in FIG. 25.

Figure 25:
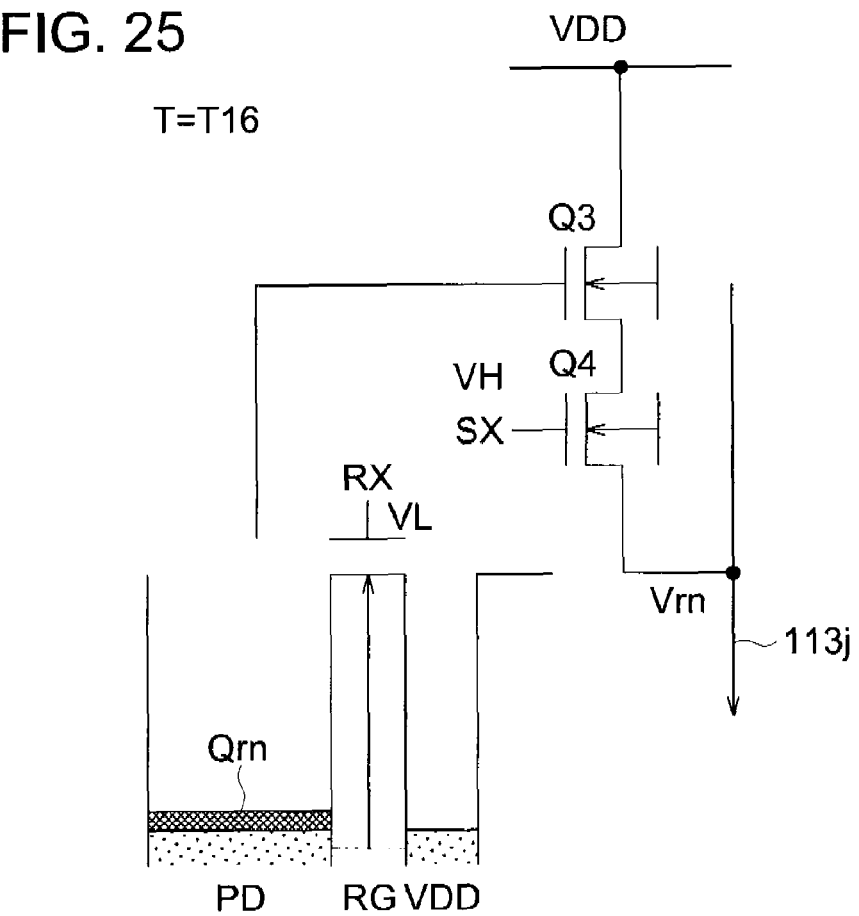
FIG. 25 is a schematic diagram showing the potential of each pixel portion at the timing T16 shown in FIG. 19.

In FIG. 25, the reset signal RX is set at the low electric potential VL to close the RG, and the noise charge Qrn caused by the reset operation remains in the PD. The readout signal SX is set at the high electric potential VH, and the noise charge Qrn remaining in the PD is read out onto the vertical signal line 113j as a noise signal Vrn. The PD is returned again from the state at the timing T16 shown in FIG. 19 to the state at the timing T11, and the next photoelectric charge Qp is to be stored.

From the output signal Vout read out at the timing T14 and the noise signal Vrn read out at the timing T16, the difference between them is taken out by the sample hold circuit, for example, 113d shown in FIG. 2, and the signaling signal Vsig which is a desired output is obtained (Vout−Vrn=Vsig).

Figure 26:
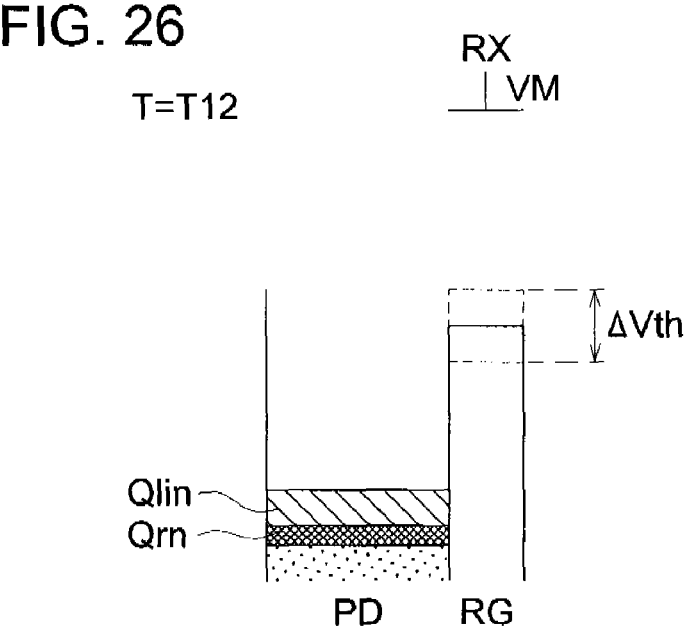
FIG. 26 is an enlarged view of the potential in the neighborhood of the PD and TG shown in FIG. 21.

Although the signaling signal Vsig from a linear-log sensor is obtained by the aforementioned operation, the inflection point TP varies with variations in the threshold Vth of the transistor Q2 (RG) as described in FIG. 4 also in this example of the circuit constitution of the pixel 113b composing the image pickup device 113. How this variation occurs will be explained by referring to FIG. 26. FIG. 26 is an enlarged view of the potential in the neighborhood of the PD and TG shown in FIG. 21.

In FIG. 26, although the reset signal RX is set at the same potential VM for the transistors Q2 (RG) of all the pixels 113b, the potential of the TG varies by ΔVth due to the variation ΔVth of the threshold of the RG. Therefore, the inflection point has the variation ΔVth between the pixels.

Figure 27:
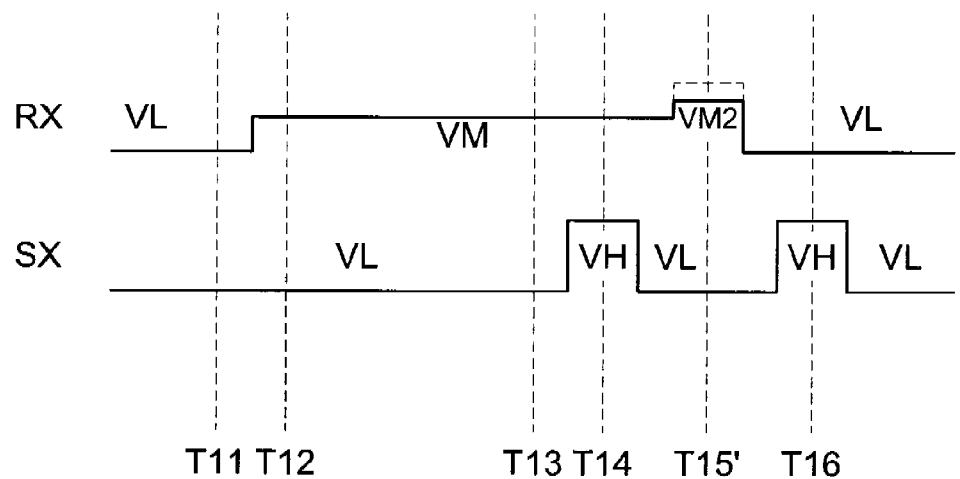
FIG. 27 is a timing chart showing a second embodiment of the present invention for driving the pixel shown in FIG. 18 as a linear-log sensor.

Next, the second embodiment of the present invention will be explained by referring to FIGS. 27 to 30. FIG. 27 is a timing chart showing the second embodiment of the present invention for driving the pixel 113b shown in FIG. 18 as the linear-log sensor.

In FIG. 27, the operation at each timing is the same as that shown in FIG. 19 except for the timing T15'. At the timing T15 shown in FIG. 19, the reset signal RX is set at the high electric potential VH, while it is set at the second intermediate electric potential VM2 in FIG. 27.

Figure 28:
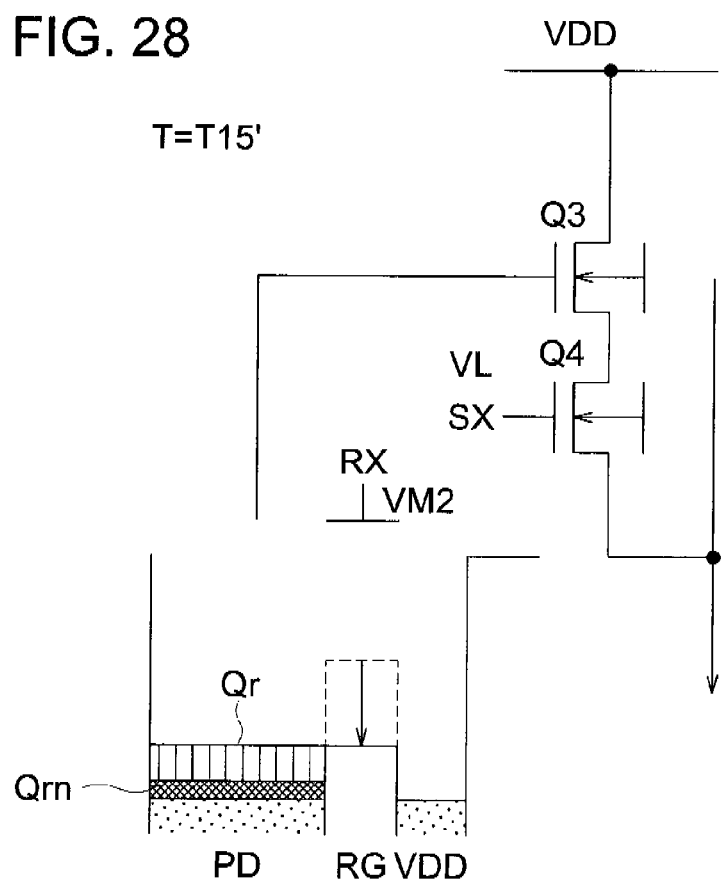
FIG. 28 is a schematic diagram showing the potential of each portion at the timing T15' shown in FIG. 27.

FIG. 28 is a schematic diagram showing the potential of each portion at the timing T15' shown in FIG. 27.

In FIG. 28, at the timing T15', the reset signal RX is set to the second intermediate electric potential VM2. The second intermediate electric potential VM2 is set such that the potential of the channel of the RG is higher than the potential in the PD due to the noise charge Qrn caused by the reset operation remaining even in the pixel where the potential of the channel of the RG, which is varied due to the variation ΔVth of the threshold of the RG, is the lowest.

Therefore, in the standard pixel, the potential of the channel of the RG is higher than the potential of the PD due to the noise charge Qrn, so that the photoelectric charge Qp (=Qlog+Qlin) stored in the PD is not completely reset to the power source VDD, and a part of the photoelectric charge Qp remains as a residual charge Qr, which depends on the variation ΔVth of the threshold, in the PD being superimposed on the noise charge Qrn.

Figure 29:
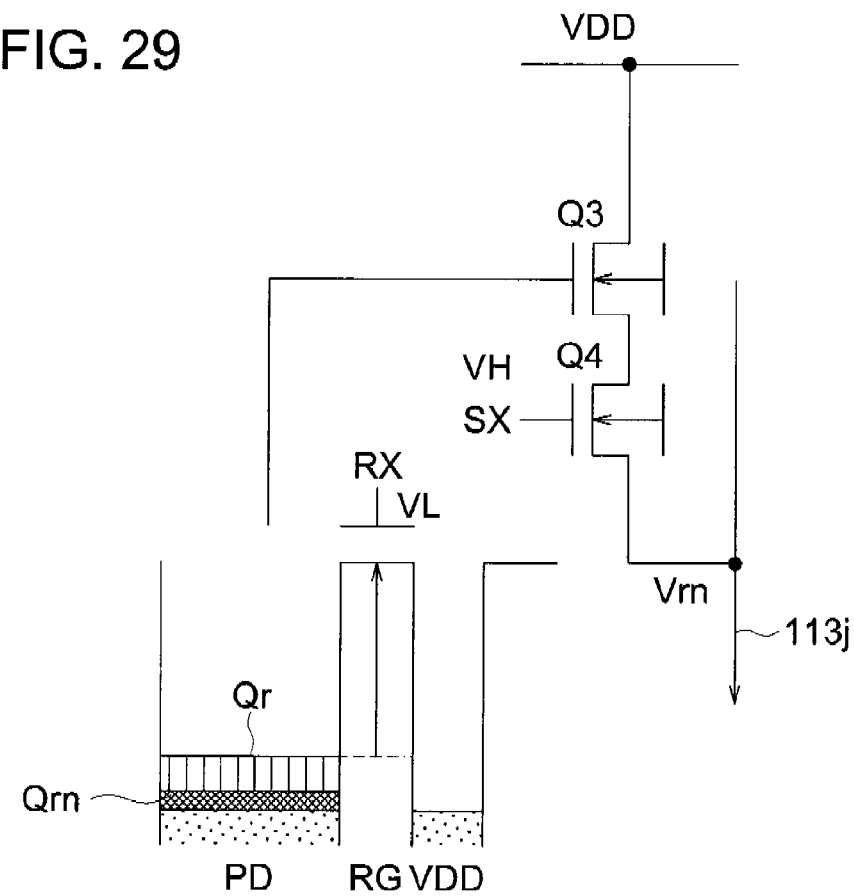
FIG. 29 is a schematic diagram showing the potential of each portion at the timing T16 shown in FIG. 27.

FIG. 29 is a schematic diagram showing the potential of each portion at the timing T16 shown in FIG. 27. The noise charge Qrn remaining in the PD and the residual charge Qr are read out onto the vertical signal line 113j as a noise signal Vrn.

Figure 30:
FIG. 30 is a schematic diagram showing the potentials at the PD and TG at the timing T12 shown in FIG. 27.
Figure 30:
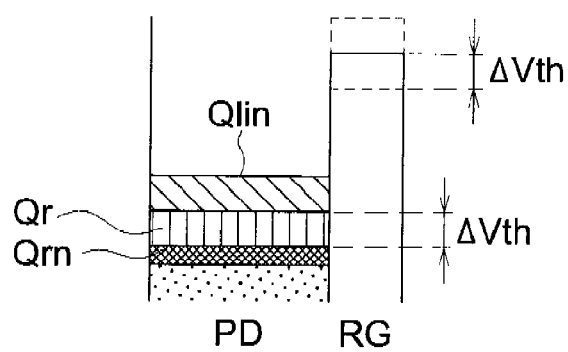

FIG. 30 is a schematic diagram showing the potential of the PD and TG at the timing T12 shown in FIG. 27. Unlike FIG. 21, the noise charge Qrn and residual charge Qr according to the variation ΔVth of the threshold remain in the PD, and the photoelectric charge Qlin of the linear characteristic is superimposed and stored on the noise charge Qrn and residual charge Qr. The potential due to the noise charge Qrn is equivalent to the variation ΔVth of the threshold of the RG, so that after all, the height of the wall of the potential of the RG for deciding the storage amount of the photoelectric charge Qlin of the linear characteristic is the same in all the pixels 113b. Therefore, variations in the inflection point caused by variations in the threshold of the RG can be canceled.

As mentioned above, according to the second embodiment of the present invention, when resetting the photoelectric charge Qp stored in the PD to the power source VDD, if the reset signal RX is set to the second intermediate potential VM2, a part of the photoelectric charge Qp stored in the PD remains in the PD as a residual charge Qr according to the variation ΔVth of the threshold of the RG. Therefore, the height of the wall of the potential of the RG can be made equal in all the pixels 113b, so that variations in the inflection point caused by the variation ΔVth of the threshold of the RG can be canceled.

As mentioned above, according to the embodiments of the present invention, when transferring the photoelectric charge stored in the photoelectric conversion element, the operation of the charge removing transistor is set so as to make the potential of the channel of the charge removing transistor higher than the minimum value of the potential of the photoelectric conversion element, thus variations of the threshold of the transistors composing the logarithmic conversion circuit can be absorbed. Therefore, provided are an image pickup device and an image pickup apparatus which can cancel variations between pixels in the inflection point caused by variations in the threshold of the transistors constituting the logarithmic conversion circuit, and the pixel size and aperture ratio are equivalent to those of an image pickup device having only the ordinary linear characteristic while using a circuit constitution similar to that of the image pickup device having only the ordinary linear characteristic.

Further, the detailed constitution and detailed operation of each component constituting the image pickup device and image pickup apparatus according to the present invention can be modified appropriately without departing from the spirit and the scope of the present invention.

What is claimed is:

1. An image pickup device, comprising:
    a plurality of pixels arranged in a matrix, the pixels being adapted to operate with two photo electric conversion characteristics of a linear characteristic and a logarithmic characteristic; each of the pixels including:
        a photoelectric conversion element; and
        a charge removing transistor with a source thereof connected to the photoelectric conversion element for removing electric charge accumulated in the photoelectric conversion element; and
    an imaging control section for controlling an imaging operation of the pixels,
    wherein, in a charge accumulation period, the imaging control section sets a gate of the charge removing transistor at a first electric potential so that:
        when the electric charge accumulated in the photoelectric conversion element is a predetermined amount or smaller, the accumulated electric charge is not removed by the charge removing transistor; and
        when the electric charge accumulated in the photoelectric conversion element is larger than the predetermined amount, a part of the accumulated electric charge is removed, and
    wherein after the charge accumulation period, the imaging control section sets the gate of the charge removing transistor at a second electric potential at which a part of the electric charge accumulated in the photoelectric conversion element is removed and the other part of the accumulated electric charge remains in the photoelectric conversion element.

2. The image pickup device of claim 1, wherein the pixel includes:
    a charge holding section provided to be connected to a drain of the charge removing transistor so as to hold the electric charge removed from the photoelectric conversion element by the charge removing transistor,
    wherein the photoelectric conversion element is a buried type photodiode, and the charge removing transistor removes the electric charge accumulated in the photoelectric conversion element during the charge accumulation period to the charge holding section when the imaging control section sets the gate of the charge removing transistor at the second electric potential.

3. The image pickup device of claim 2, wherein the pixel includes:
    a readout section for reading out an electric potential of the charge holding section onto an outside of the pixel as an output signal,
    wherein the imaging control section causes the charge removing transistor to transfer the electric charge accumulated in the photoelectric conversion element to the charge holding section after a noise component remaining in the charge holding section is read out by the readout section.

4. The image pickup device of claim 3, wherein the pixel includes:
    a reset transistor for resetting the electric charge held in the charge holding section,
    wherein the readout section includes:
    an amplifier transistor for generating a buffered signal by current-amplifying the electric potential of the electric charge in the charge holding section; and
    a readout transistor for reading out the buffered signal onto an outside of the pixel as the output signal,
    wherein a drain of the reset transistor and a drain of the amplifier transistor are supplied with a same electric potential.

5. The image pickup device of claim 1, wherein the photoelectric conversion element is a surface type PN junction photodiode, and the imaging control section sets the gate of the charge removing transistor to reset, before the accumulation period, the electric charge accumulated in the photoelectric conversion element.

6. The image pickup device of claim 5, wherein the pixel includes:
    a readout section for reading out an electric potential of the electric charge accumulated in the photoelectric conversion element onto an outside of the pixel as an output signal,
    wherein the imaging control section sets the gate of the charge removing transistor at the second electric potential to reset the electric charge accumulated in the photoelectric conversion element after the electric potential of the electric charge accumulated in the photoelectric conversion element is read out by the readout section.

7. The image pickup device of claim 6, wherein the readout section includes:
    an amplifier transistor for generating a buffered signal by current-amplifying the electric potential of the electric charge accumulated in the photoelectric conversion element; and
    a readout transistor for reading out the buffered signal onto an outside of the pixel as the output signal, wherein a drain of the amplifier transistor and a drain of the reset transistor are supplied with a same electric potential.

8. An image pickup apparatus, comprising:
an image pickup device; and
an imaging optical system for guiding a light beam from an object to the image pickup device,
wherein the image pickup device includes:
a plurality of pixels arranged in a matrix, the pixels being adapted to operate with two photo electric conversion characteristics of a linear characteristic and a logarithmic characteristic; each of the pixels including:
a photoelectric conversion element; and
a charge removing transistor with a source thereof connected to the photoelectric conversion element for removing electric charge accumulated in the photoelectric conversion element; and an imaging control section for controlling an imaging operation of the pixels, wherein, in a charge accumulation period, the imaging control section sets a gate of the charge removing transistor at a first electric potential so that: when the electric charge accumulated in the photoelectric conversion element is a predetermined amount or smaller, the accumulated electric charge is not removed by the charge removing transistor; and when the electric charge accumulated in the photoelectric conversion element is larger than the predetermined amount, a part of the accumulated electric charge is removed, and wherein after the charge accumulation period, the imaging control section sets the gate of the charge removing transistor at a second electric potential at which a part of the electric charge accumulated in the photoelectric conversion element is removed and the other part of the accumulated electric charge remains in the photoelectric conversion element.

9. An image pickup device, comprising:
a plurality of pixels arranged in a matrix, the pixels being adapted to operate with two photo electric conversion characteristics of a linear characteristic and a logarithmic characteristic; each of the pixels including:
a photoelectric conversion element; and
a charge removing transistor with a source thereof connected to the photoelectric conversion element for removing electric charge accumulated in the photoelectric conversion element;
a charge holding section for holding the electric charge accumulated in the photoelectric conversion element; and
a readout section for reading out an electric potential of the charge holding section onto an outside of the pixel as an output signal; and
an imaging control section for controlling an imaging operation of the pixels,
wherein the photoelectric conversion element is a buried type photodiode, and the charge removing transistor functions as a transfer transistor for transferring the removed electric charge, which is removed by the charge removing transistor, to the charge holding section,
wherein when the imaging control section causes the charge removing transistor to remove the electric charge accumulated in the photoelectric conversion element, the imaging control section controls the charge removing transistor such that a gate of the charge removing transistor is set at an electric potential at which not all of the electric charge accumulated in the photoelectric conversion element is removed, and
wherein the imaging control section causes the transfer transistor to transfer the electric charge accumulated in the photoelectric conversion element to the charge holding section after a noise component remaining in the charge holding section is read out by the readout section.

10. The image pickup device of claim 9, wherein the pixel includes:
a reset transistor for resetting the electric charge held in the charge holding section,
wherein the readout section includes:
an amplifier transistor for generating a buffered signal by current-amplifying the electric potential of the electric charge in the charge holding section; and
a readout transistor for reading out the buffered signal onto an outside of the pixel as the output signal,
wherein a drain of the reset transistor and a drain of the amplifier transistor are supplied with a same electric potential.

* * * * *